US012231512B2

(12) United States Patent
Deng et al.

(10) Patent No.: US 12,231,512 B2
(45) Date of Patent: Feb. 18, 2025

(54) MEASUREMENT OF INTERNET MEDIA CONSUMPTION

(71) Applicant: The Nielsen Company (US), LLC, New York, NY (US)

(72) Inventors: Kevin Keqiang Deng, Oldsmar, FL (US); Joseph Kerkes, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/460,503

(22) Filed: Sep. 1, 2023

(65) Prior Publication Data

US 2024/0129376 A1 Apr. 18, 2024

Related U.S. Application Data

(63) Continuation of application No. 17/976,727, filed on Oct. 28, 2022, now Pat. No. 11,785,107, which is a continuation of application No. PCT/US2021/029938, filed on Apr. 29, 2021, which is a continuation of application No. 16/864,118, filed on Apr. 30, 2020, now Pat. No. 11,553,054.

(51) Int. Cl.
*H04L 67/50* (2022.01)
*H04L 61/4511* (2022.01)

(52) U.S. Cl.
CPC ........ *H04L 67/535* (2022.05); *H04L 61/4511* (2022.05)

(58) Field of Classification Search
CPC ............................. H04L 67/22; H04L 61/1511
See application file for complete search history.

(56) References Cited

U.S. PATENT DOCUMENTS

| | | | | |
|---|---|---|---|---|
| 8,327,396 | B2* | 12/2012 | Ramaswamy | H04N 21/4432 725/19 |
| 8,561,188 | B1* | 10/2013 | Wang | H04L 63/1425 713/176 |
| 8,600,811 | B2* | 12/2013 | Humphries, IV | G06Q 30/02 705/14.47 |
| 8,856,816 | B2* | 10/2014 | Falcon | H04N 21/44213 725/18 |
| 2004/0122679 | A1* | 6/2004 | Neuhauser | H04H 60/375 704/500 |
| 2007/0106405 | A1* | 5/2007 | Cook | G06F 16/634 707/E17.101 |

(Continued)

*Primary Examiner* — Jimmy H Tran

(57) ABSTRACT

Methods, apparatus, and systems are disclosed to measure media consumption. An apparatus includes a memory, machine readable instructions, and processor circuitry to instantiate or execute the machine readable instructions to access a domain pattern signature representative of a request to obtain media, the domain pattern signature includes (a) a set of domain names and (b) one or more of a location of the request, a time of the request, or a characteristic of a device used to execute the request, compare the domain pattern signature to one or more reference signatures, determine a first reference signature includes (a) a matching set of domain names and (b) one or more of a matching location of the request, a matching time of the request, or a matching characteristic of the device used to execute the request, and credit the domain pattern signature with an Internet site associated with the first reference signature.

20 Claims, 10 Drawing Sheets

(56) References Cited

U.S. PATENT DOCUMENTS

| | | | | |
|---|---|---|---|---|
| 2007/0271300 A1* | 11/2007 | Ramaswamy | H04N 21/266 | |
| 2008/0126420 A1* | 5/2008 | Wright | H04N 21/42684 | 348/E7.071 |
| 2009/0049465 A1* | 2/2009 | Deng | H04H 60/37 | 725/19 |
| 2009/0305680 A1* | 12/2009 | Swift | H04L 43/00 | 455/414.1 |
| 2010/0095320 A1* | 4/2010 | Lee | H04N 21/8352 | 725/19 |
| 2010/0185865 A1* | 7/2010 | Yeap | G06Q 20/3825 | 713/176 |
| 2011/0093878 A1* | 4/2011 | Falcon | H04H 60/33 | 725/14 |
| 2012/0301031 A1* | 11/2012 | Wright | G06V 20/40 | 382/190 |
| 2012/0304212 A1* | 11/2012 | Lee | H04H 60/45 | 725/14 |
| 2013/0054402 A1* | 2/2013 | Asherman | G06Q 30/06 | 705/26.2 |
| 2013/0174190 A1* | 7/2013 | Ramaswamy | H04N 21/44213 | 725/14 |
| 2013/0198125 A1* | 8/2013 | Oliver | G06Q 30/0204 | 706/46 |
| 2013/0318349 A1* | 11/2013 | O'Brien | H04L 9/3215 | 713/168 |
| 2013/0347017 A1* | 12/2013 | Li | H04N 21/4126 | 725/18 |
| 2014/0047468 A1* | 2/2014 | Nielsen | H04N 21/8358 | 725/14 |
| 2014/0105447 A1* | 4/2014 | Samari | G06F 16/683 | 382/100 |
| 2014/0106708 A1* | 4/2014 | Samari | H04N 21/42203 | 455/410 |
| 2014/0189108 A1* | 7/2014 | Frett | H04H 60/66 | 709/224 |
| 2014/0208339 A1* | 7/2014 | Deng | H04H 60/56 | 725/9 |
| 2014/0223171 A1* | 8/2014 | Novack | H04L 9/3231 | 713/176 |
| 2014/0244828 A1* | 8/2014 | Besehanic | H04L 67/535 | 709/224 |
| 2014/0273923 A1* | 9/2014 | Papakostas | H04W 4/21 | 455/405 |
| 2014/0280896 A1* | 9/2014 | Papakostas | H04W 4/50 | 709/224 |
| 2014/0330854 A1* | 11/2014 | Samari | G06F 16/7834 | 707/758 |
| 2014/0344295 A1* | 11/2014 | Lam | G06F 16/9535 | 707/754 |
| 2015/0113575 A1* | 4/2015 | Li | H04N 21/235 | 725/92 |
| 2015/0180989 A1* | 6/2015 | Seth | G06Q 30/0276 | 709/224 |
| 2015/0289013 A1* | 10/2015 | Nelson | H04N 21/25891 | 725/19 |
| 2015/0319500 A1* | 11/2015 | McMillan | H04N 21/8358 | 725/19 |
| 2015/0319508 A1* | 11/2015 | McMillan | H04N 21/8358 | 382/100 |
| 2016/0055244 A1* | 2/2016 | Wang | G06F 16/337 | 707/770 |
| 2016/0078459 A1* | 3/2016 | Borland | H04L 67/306 | 705/7.33 |
| 2016/0232538 A1* | 8/2016 | Papakostas | H04L 67/02 | |
| 2016/0286266 A1* | 9/2016 | Moshitch | G06V 20/46 | |
| 2017/0041301 A1* | 2/2017 | Borland | H04L 63/0457 | |
| 2017/0064351 A1* | 3/2017 | Jakkula | H04N 21/4583 | |
| 2017/0228795 A1* | 8/2017 | Papakostas | G06F 16/951 | |
| 2017/0264952 A1* | 9/2017 | Nelson | H04N 21/4408 | |
| 2018/0139482 A1* | 5/2018 | Bhatia | H04N 21/25808 | |
| 2018/0165286 A1* | 6/2018 | Ranganathan | G06V 10/96 | |
| 2018/0191850 A1* | 7/2018 | Tapse | H04L 67/535 | |
| 2018/0227374 A1* | 8/2018 | Besehanic | H04L 67/535 | |
| 2018/0317046 A1* | 11/2018 | Brooks | H04W 4/02 | |
| 2018/0352052 A1* | 12/2018 | Besehanic | H04L 67/60 | |
| 2019/0058907 A1* | 2/2019 | Schenker | H04N 21/6582 | |
| 2019/0058911 A1* | 2/2019 | McMillan | H04N 21/25883 | |
| 2019/0273958 A1* | 9/2019 | Srinivasan | H04N 21/23418 | |
| 2019/0342732 A1* | 11/2019 | Papakostas | H04W 4/50 | |
| 2019/0364125 A1* | 11/2019 | Cimino | H04L 63/1425 | |
| 2019/0364312 A1* | 11/2019 | Ramaswamy | H04N 21/84 | |
| 2019/0373327 A1* | 12/2019 | Borawski | H04L 67/025 | |
| 2020/0008011 A1* | 1/2020 | Splaine | H04W 4/023 | |
| 2020/0167809 A1* | 5/2020 | Alla | G06Q 30/0241 | |
| 2020/0177480 A1* | 6/2020 | Ramaswamy | H04N 21/8126 | |
| 2020/0186877 A1* | 6/2020 | Besehanic | H04N 21/258 | |
| 2020/0195736 A1* | 6/2020 | Abello | H04L 67/02 | |
| 2020/0226626 A1* | 7/2020 | Splaine | G06Q 30/0204 | |
| 2020/0236014 A1* | 7/2020 | Bosworth | G06Q 30/0242 | |
| 2020/0236182 A1* | 7/2020 | Bosworth | G06F 8/77 | |
| 2020/0275145 A1* | 8/2020 | Jakkula | H04N 21/84 | |
| 2020/0296018 A1* | 9/2020 | Pilkington-Lewis | H04L 43/0894 | |
| 2020/0304945 A1* | 9/2020 | Splaine | H04W 4/023 | |
| 2020/0366746 A9* | 11/2020 | Heffernan | H04L 67/146 | |
| 2020/0366754 A1* | 11/2020 | Wang | H04L 9/3247 | |
| 2021/0037286 A1* | 2/2021 | Conklin | H04N 21/422 | |
| 2021/0152654 A1* | 5/2021 | Agarwal | H04L 67/568 | |
| 2021/0157840 A1* | 5/2021 | Ranganathan | G06V 10/96 | |
| 2021/0160329 A1* | 5/2021 | Livshits | H04L 67/146 | |
| 2021/0176511 A1* | 6/2021 | McMillan | H04N 21/25841 | |
| 2021/0194947 A1* | 6/2021 | Mortensen | H04L 65/65 | |
| 2021/0288942 A1* | 9/2021 | Preda | H04L 65/612 | |
| 2021/0344983 A1* | 11/2021 | Mannion | H04N 21/44204 | |
| 2022/0159091 A1* | 5/2022 | Besehanic | H04L 65/80 | |
| 2022/0166633 A1* | 5/2022 | Whittaker | H04L 9/3247 | |
| 2023/0008757 A1* | 1/2023 | Shribman | H04N 21/4622 | |
| 2023/0127341 A1* | 4/2023 | Papakostas | G06F 16/285 | 705/7.29 |
| 2024/0098335 A1* | 3/2024 | Kerkes | H04N 21/2547 | |

* cited by examiner

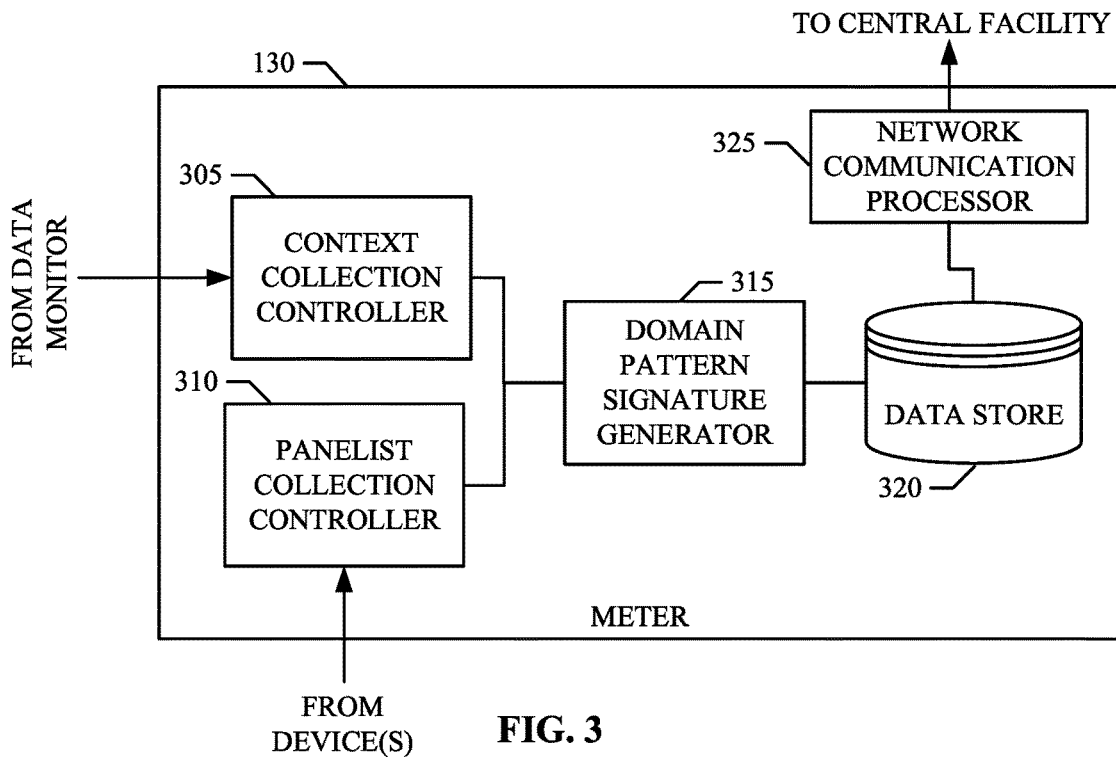

FIG. 3

| | LOCATION | MEDIA PROVIDER | TIME | | VISIBLE DOMAIN |
|---|---|---|---|---|---|
| 425 | OFFICE | AT&T® | 02/22/2020 | 10:00 AM | https://m.youtube.com/ |
| 430 | OFFICE | AT&T® | 02/22/2020 | 10:00 AM | r6---sn-8xgp1vo-2ial.googlevideo.com |
| | HOME | AT&T® | 02/22/2020 | 11:00 AM | https://m.youtube.com/ |
| | HOME | AT&T® | 02/22/2020 | 11:00 AM | r6---sn-hp57kn6l.googlevideo.com |
| | HOME | AT&T® | 02/22/2020 | 8:00 PM | https://m.youtube.com/ |
| | HOME | AT&T® | 02/22/2020 | 8:00 PM | r6---sn-hp57ynel.googlevideo.com |
| | OFFICE | AT&T® | 02/25/2020 | 11:00 AM | https://m.youtube.com/ |
| | OFFICE | AT&T® | 02/25/2020 | 11:00 AM | r1---sn-8xgp1vo-p5ql.googlevideo.com |

TABLE 1 – DEVICE 125A

FIG. 4

MEASUREMENT OF INTERNET MEDIA CONSUMPTION

CROSS REFERENCE TO RELATED APPLICATIONS

The present disclosure is a continuation of U.S. patent application Ser. No. 17/976,727, filed Oct. 28, 2022, now U.S. Pat. Nos. 11,785,107, which is a continuation of International Patent Application No. PCT/US2021/029938, filed Apr. 29, 2021, which is a continuation of U.S. patent application Ser. No. 16/864,118, filed Apr. 30, 2020, now U.S. Pat. No. 11,553,054. U.S. patent application Ser. No. 17/976,727, International Patent Application No. PCT/US2021/029938, and U.S. patent application Ser. No. 16/864,118 are hereby incorporated herein by reference in their entireties. Priority to U.S. patent application Ser. No. 17/976,727, International Patent Application No. PCT/US2021/029938, and U.S. patent application Ser. No. 16/864,118 is hereby claimed.

FIELD OF THE DISCLOSURE

This disclosure relates generally to media measurement, and, more particularly, to measurement of Internet media consumption.

BACKGROUND

In recent years, methods of accessing Internet content or media have evolved. For example, Internet media was formerly primarily accessed via computer systems such as desktop and laptop computers. Recently, handheld mobile devices (e.g., smartphones) and other Internet of Thing (IoT) devices have been introduced that allow users to request and view Internet media.

BRIEF DESCRIPTION OF THE DRAWINGS

FIG. 3 is a block diagram of an example meter of FIG. 1 to collect monitoring information and generate media consumption or exposure data.

FIG. 4 is a table that may be representative of information stored and/or obtained by an example context collection controller of FIG. 3.

The figures are not to scale. In general, the same reference numbers will be used throughout the drawing(s) and accompanying written description to refer to the same or like parts.

Figure 1:
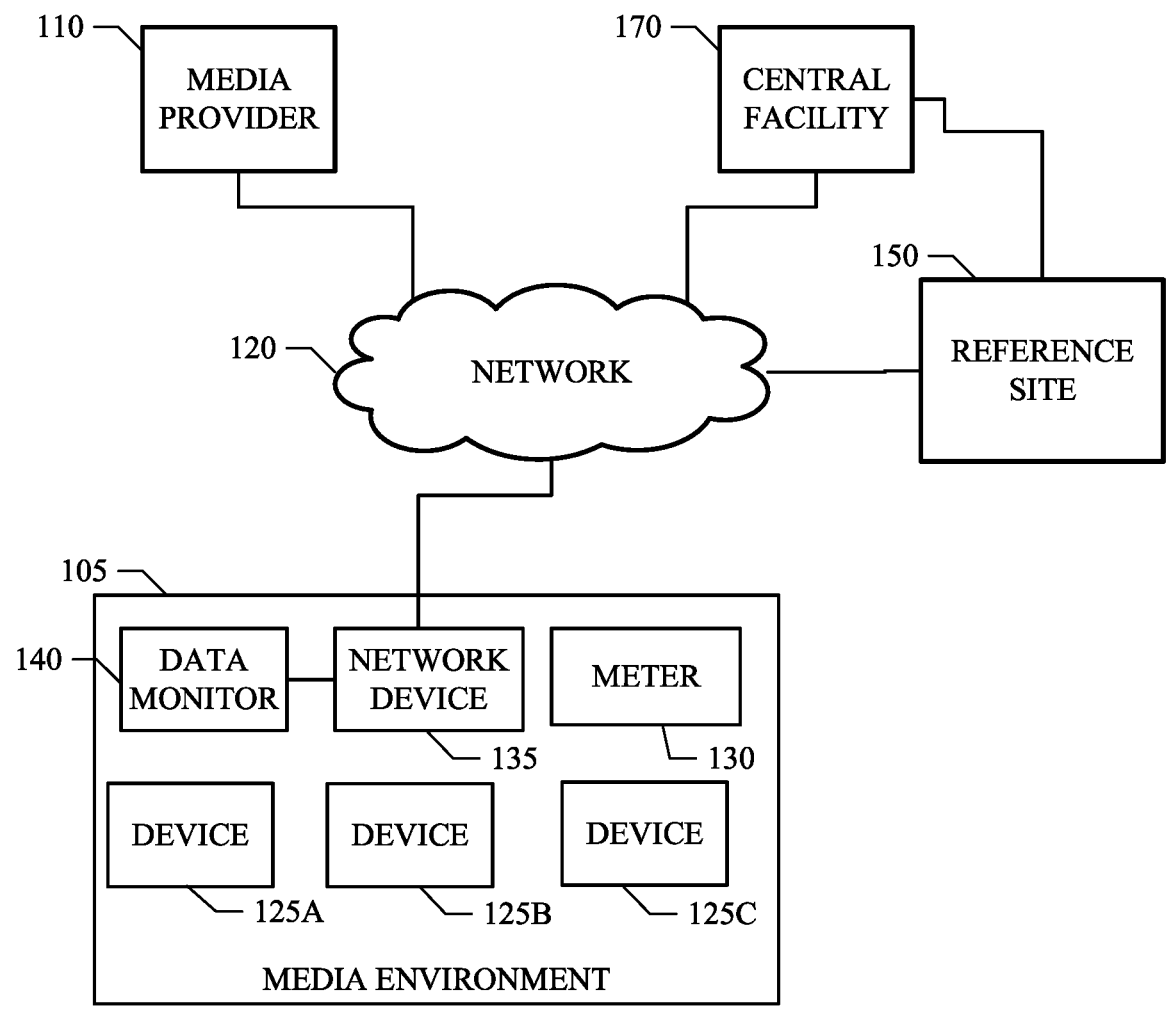
FIG. 1 is a block diagram of an example system constructed in accordance with the teachings of this disclosure to monitor media consumption in an example networked environment such as, for example, an Internet environment.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Monitoring companies including, for example, audience measurement entities, desire to gain knowledge on how users interact with their multiple devices such as smartphones, televisions, tablets, laptops, etc. For example, monitoring companies want to monitor Internet traffic to and/or from the multiple devices to, among other things, monitor exposure to advertisements and/or other media content, determine advertisement effectiveness, determine user behavior, identify purchasing behavior associated with various demographics, credit application usage, credit streaming media and/or downloaded media, etc. As used herein, crediting is defined as assigning exposure measurements (e.g., numbers of audience members that have been exposed to the media for a predefined period of time) and/or consumption measurements to a media source, such as a media service, an advertisement service, etc. In some examples, web entities that provide streaming media desire to measure the demographics and exposure their streaming services receive. For example, Netflix® and/or Hulu® desire reports including a number of panelists that view their streaming data, what day the number of panelists viewed the streaming data, etc.

As used herein, a panelist is a person, selected by a monitoring company, who agrees to be monitored. In some examples, a household of panelists agree to comply with the monitoring companies. In such an example, the monitoring company installs one or more metering devices in the household. The metering devices may identify media and associate (e.g., correlate) media to the panelists. To monitor and credit Internet/network traffic of the household, conventional systems utilize a data monitor, coupled to a network device, to catch and/or collect any Internet traffic that comes to and from panelist devices. As used herein, a network device may be a router, a gateway, a modem, a network bridge, a wireless access point, etc. installed within the media environment. As used herein, a data monitor is a packet sniffer, a proxy server, an application programming interface (API) of an operating system of the device, etc. In some examples, the data monitor provides the network traffic to a metering device, such as a meter, or a central facility.

In some examples, the data monitor collects traffic patterns that correspond to a web request. The traffic patterns include source Internet Protocol (IP) addresses or universal resource locators (URLs) in addition to corresponding data sizes. As used herein, source IP addresses and domain parts of URLs (e.g., domains, domain names, etc.) are used interchangeably. For example, the data monitor collects one or more URLs for media requested by the panelist(s). In some examples, the data monitor identifies and/or determines (e.g., extracts, transforms, derives, decodes, converts, etc.) domain names of the URL. A domain name is a user-friendly portion of the URL indicative of a destination IP address. For example, <http://www.abcd.com/index.html> is the URL, and "abcd.com" is the domain name. The data monitor collects a plurality of traffic patterns (e.g., domain names) and provides the traffic patterns to the central facility for further processing. The central facility (e.g., back office) may include a plurality of human analysts to analyze network traffic to credit web servers.

In some examples, when a domain (e.g., a web server) associated with requested data is collected, the domain is classified (e.g., credited, identified, etc.) manually (e.g., by a human analyst). Then, when the domain is collected by the data monitor again, a system at the back office classifies the domain automatically, based on its prior classification. These prior techniques for crediting/classifying domains based on collected network traffic include at least two problems. The domain names identified in the network traffic do not always accurately reflect the domain of interest (e.g., the destination web server). For example, the domain of interest (e.g., the destination web server) may have corresponding servers (e.g., content delivery network (CDN) servers) that are configured to provide the requested data when network traffic is high. In such an example, the human analyst(s) may require a significant amount of time to determine (e.g., credit) the intended and/or desired domain of interest. Lastly, when a human analyst analyzes the network traffic, the human analyst classifies/credits the domain having with the highest bandwidth of data. In some examples, the highest bandwidth domain is the CDN server. Therefore, during automatic classification, the measurement is credited to the CDN server, instead of the domain of interest (e.g., the intended domain of the request).

Examples disclosed herein accurately credit Internet media consumption for a given media environment. Examples disclosed herein generate reference signatures at a reference site to compare against domain pattern signatures generated at a media environment and/or a central facility. The reference signatures are indicative of a known site of interest, as well as a device type (e.g., a mobile phone, a laptop, and over-the-top device, etc.), a location, a time, and a domain pattern. As used herein, a domain pattern is a set of domain names generated during an Internet request. For example, when a device executes an Internet request, a series of domains names are generated throughout the request until the desired data (e.g., the requested data) is obtained by the device. As used herein, desired data, requested data, Internet content, Internet media, data from the domain of interest, media, and media content correspond to the media being consumed by an audience and/or measured by an audience measurement entity. In some examples, the domain names include names of ad servers, CDN servers, the domain of interest server, etc. In some examples, the domain pattern is static for a particular location, device, media provider, time, and/or site of interest. For example, when a panelist requests a YouTube® video on their mobile device, at their house, in the morning, the servers generate the same domain pattern for the request. In this manner, a domain pattern signature indicative of location A, device A, time A, domain pattern A, and media provider A can be matched against a reference signature having the same data and thus, accurately credited for the site of interest corresponding to the reference signature.

FIG. 1 is a block diagram of an example system 100 constructed in accordance with the teachings of this disclosure to monitor or measure media consumption in an example media environment 105. The example system 100 includes the example media environment 105, an example media provider 110, an example network 120, an example reference site 150, and an example central facility 170.

In the illustrated example of FIG. 1, the media environment 105 is a household (e.g., a room in a home of a panelist, such as the home of a "Nielsen family") that has been statistically selected to develop media (e.g., streaming media) ratings data for a population/demographic of interest.

In the illustrated example of FIG. 1, the example media provider 110 includes one or more servers providing Internet media (e.g., web pages, audio, video, images, etc.). The example media provider 110 of FIG. 1 may be implemented by any provider(s) of media such as a digital media broadcaster, a multicaster, a unicaster (e.g., a cable television service, a fiber-optic television service, an IPTV provider, etc.), an on-demand digital media provider (e.g., an Internet streaming video and/or audio service such as Netflix®, YouTube®, Hulu®, Pandora®, Last.fm®, etc.), a web page (e.g., an online store such as Amazon.com®), and/or any other provider and/or creator of media.

In the illustrated example of FIG. 1, the example network 120 is a wide area network (WAN) such as the Internet. However, in some examples, local networks may additionally or alternatively be used. For example, multiple networks (e.g., a cellular network, an Ethernet network, etc.) may be utilized to implement the example network 120 of FIG. 1.

In the illustrated example of FIG. 1, the example media environment 105 includes a plurality of devices 125A, 125B, 125C. The example devices 125A, 124B, 125C are media devices that retrieve and/or receive media from the example media provider 110 for presentation. In some examples, the devices 125A, 125B, 125C are capable of directly presenting media (e.g., via a display) while, in other examples, the devices 125A, 125B, 125C present the media on separate media presentation equipment (e.g., speakers, a display, etc.). Alternatively, one or more of the example devices 125A, 125B, 125C directly present media and one or more of the example devices 125A, 125B, 125C present media on separate equipment. Thus, as used herein "media devices" may or may not be able to present media without assistance from a second device. In some examples, the media devices 125A, 125B, 125C are consumer electronics. For example, one of the devices 125A, 125B, 125C of the illustrated example is a personal computer such as a laptop computer, and thus, is capable of directly presenting media (e.g., via an integrated and/or connected display and speakers). Additionally and/or alternatively, any other type(s) and/or number(s) of device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, IoT devices, watches (e.g., smartwatches), fitness trackers, headsets, vehicle control units (e.g., an engine control unit, an electronic control unit, etc.), edge devices, etc. may additionally or alternatively be used.

In the illustrated example of FIG. 1, the media environment 105 includes an example meter 130 to detect exposure to media and store monitoring information (e.g., streaming media signatures, an identifier of a panelist, a timestamp of the time of the presentation) of the presented media. In the examples disclosed herein, exposure of media corresponds to media consumption. The stored monitoring information is transmitted to the central facility 170 via an example network device 135 and the example network 120. While the media monitoring information is transmitted by electronic transmission in the illustrated example of FIG. 1, the media monitoring information may additionally or alternatively be transferred in any other manner, such as, for example, by physically mailing the meter 130, by physically mailing a memory of the meter 130, etc.

The meter 130 of the illustrated example of FIG. 1 combines audience measurement data and people metering data. For example, audience measurement data is determined by monitoring media output by or presented on the media devices 125A, 125B, 125C and/or other media presentation device(s), and audience identification data (also referred to as demographic data, people monitoring data, etc.) is determined from people monitoring data provided to the meter 130. Thus, the example meter 130 provides dual functionality of a content measurement meter and a people meter. As a content measurement meter, the meter 130 collects content measurement data, which may include, for example, audience measurement data and/or media consumption data. As a people meter, the meter 130 collects and/or associates demographic information corresponding to the collected content measurement data.

For example, the meter 130 of the illustrated example collects network traffic information and/or audience measurement data (e.g., domain names, domain patterns, time of exposure information, etc.) and people data (e.g., user identifiers, demographic data associated with audience members, etc.). The network traffic information and the people data can be combined to generate, for example, media exposure data (e.g., ratings data) indicative of amount(s) and/or type(s) of people that were exposed to specific piece(s) of web media, streaming media, Internet media, downloaded media, etc., distributed via the media devices 125A, 125B, 125C. To extract media identification data from network traffic data, the meter 130 extracts and/or processes the domain patterns from the collected network traffic information, which can be compared to reference signatures indicative of known domain patterns, to perform source and/or content identification. Any other type(s) and/or number of media monitoring techniques can be supported by the meter 130.

Depending on the type(s) of metering the meter 130 is to perform, the meter 130 can be physically coupled to the devices 125A, 125B, 125C or may be configured to capture signals emitted externally by the devices 125A, 125B, 125C (e.g., free field audio) such that direct physical coupling to the devices 125A, 125B, 125C is not required. For example, the meter 130 of the illustrated example may employ non-invasive monitoring not involving any physical connection to the devices 125A, 125B, 125C (e.g., via Bluetooth® connection, WIFI® connection, acoustic watermarking, etc.) and/or invasive monitoring involving one or more physical connections to the devices 125A, 125B, 125C (e.g., via USB connection, a High Definition Media Interface (HDMI) connection, an Ethernet cable connection, etc.). The example meter 130 is described in further detail below in connection with FIG. 3.

In the illustrated example of FIG. 1, the example media environment 105 includes the example network device 135 to enable the meter 130 and/or other devices 125A, 125B, 125C in the media environment 105 to communicate with the network 120 (e.g., the Internet). In some examples, the network device 135 is a router. Alternatively or additionally, the example network device 135 is a gateway, a modem, a network bridge, etc.

The example network device 135 includes an example data monitor 140 to collect network traffic in the example media environment 105. The example data monitor 140 monitors network communications in the example media environment 105 to collect the network traffic. For example, the data monitor 140 may operate as a packet sniffer, may operate as a proxy server, may query an application programming interface (API) of operating systems of the media devices 125A, 125B, 125C, may communicate with the example network device 135 communicatively coupled to the media devices 125A, 125B, 125C (e.g., a router, a switch, a gateway, a firewall, etc.), and/or may obtain network data in any other manner.

In some examples, the data monitor 140 collects URLs associated with a web request for media requested by the panelist(s). In some examples, the collection of URLs is referred to as the traffic pattern for the web request. The example data monitor 140 identifies the traffic pattern associated with the web request, including the source of the traffic, the duration of the traffic, the bandwidth of the traffic, and/or the direction of the traffic. These characteristics of the traffic are visible (e.g., identifiable) to the example data monitor 140. However, the payload of the traffic (e.g., the media content requested in the URL) is invisible and/or encrypted (e.g., unidentifiable) to the example data monitor 140. In this manner, the identifiable characteristics of the network traffic are utilized to generate domain pattern signatures for a/the panelist(s) requesting media via the example network 120 in order to identify the media.

In the illustrated example of FIG. 1, the example reference site 150 generates reference signatures for use in identifying media exposure data. The example reference site 150 may be implemented by the example central facility 170. In some examples, the reference site 150 is a Media Monitoring Site (MMS) located at a media market. In some examples, the reference site 150 is an MMS located at the central facility 170. An MMS may generate, collect, and process data from a variety of media providers (e.g., ISPs) and devices within a physical range of the site. For example, an MMS located in Chicago, IL may generate reference signatures by collecting network traffic occurring between a device and an ISP located in Chicago, IL.

As used herein, the reference site 150 will be described in connection with the example central facility 170. For example, in examples disclosed herein, the central facility 170 implements the reference site 150 by generating reference signatures. The reference site 150 and the central facility 170 are described in further detail below in connection with FIG. 5. Although the reference site 150 is described in connection with the central facility 170, the reference site 150 can be located at the media environment 105 or at any other suitable location.

In the illustrated example of FIG. 1, the example central facility 170 provides the meter 130 to the media environment 105. During installation and/or registration of the meter 130 in the media environment 105, the central facility 170 receives user identifying information (e.g., demographic information for user(s) of the media devices 125A, 125B, 125C). Additionally, the central facility 170 receives media identification data generated by the example meter 130. In some examples, the media identification data corresponds to the domain pattern signatures generated by the example meter 130.

While a single central facility 170 is shown in FIG. 3, a plurality of central facilities 170 may be implemented and/or included to provide meters to different media environments as well as to receive user identifying information and media identifying information from the meters of the different media environments. For example, the central facility 170 could implement one of a plurality of Media Monitoring Sites (MMSs) located across different media markets.

The example central facility 170 generates reference signatures in addition to receiving and/or obtaining domain pattern signatures from the example media environment 105. For example, the central facility 170 implements the reference site 150 which includes hardware and/or software to request streaming media, other media, and/or other data from a site of interest (e.g., an Internet site). The example central facility 170 further includes a data monitor to monitor and collect the network traffic of the hardware and/or software requesting the media and/or data. The example central facility 170 generates reference signatures based on the collected network traffic. The reference signatures are stored in a database for subsequent use by the example central facility 170. For example, the central facility 170 compares the domain pattern signatures, obtained from the meter 130 and/or generated at the central facility 170, to the reference signatures to determine a match.

The example central facility 170 aggregates the collected media identification data to generate reports regarding exposure or consumption to the media. For example, the central facility 170 of this example compiles media exposure metrics based on the association (e.g., correlation) of the domain pattern signatures that matched a reference signature, and the user-identifying information. In some examples, a report is generated to indicate media exposure, audience size, and/or audience characteristics (e.g., demographics). In some examples, the exposure measurements provide ratings information for different media (e.g., a particular website, a particular video, etc.) In some examples, the exposure measurements indicate ratings information and/or usage statistics for different media provided by the media provider 110 and/or a plurality of media providers 110. The example central facility 170 of FIG. 1 is associated with a neutral audience measurement entity that ensures that validity and integrity of the exposure metrics. Alternatively, the example central facility 170 may be associated with any other entity. The example central facility 170 is described in further detailed below in connection with FIG. 5.

While an example manner of implementing the media environment 105 of FIG. 1 is illustrated in FIG. 1, one or more of the elements, processes and/or devices illustrated in FIG. 1 may be combined, divided, re-arranged, omitted, eliminated and/or implemented in any other way. Further, the example first device 125A, the example second device 125B, the example third device 125C, the example meter 130, the example network device 135, the example data monitor 140, and/or, more generally, the example media environment 105 of FIG. 1 may be implemented by hardware, software, firmware and/or any combination of hardware, software and/or firmware. Thus, for example, any of the example first device 125A, the example second device 125B, the example third device 125C, the example meter 130, the example network device 135, the example data monitor 140, and/or, more generally, the example media environment 105 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first device 125A, the example second device 125B, the example third device 125C, the example meter 130, the example network device 135, and/or the example data monitor 140, is/are hereby expressly defined to include a non-transitory computer readable storage device or storage disk such as a memory, a digital versatile disk (DVD), a compact disk (CD), a Blu-ray disk, etc. including the software and/or firmware. Further still, the example media environment 105 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
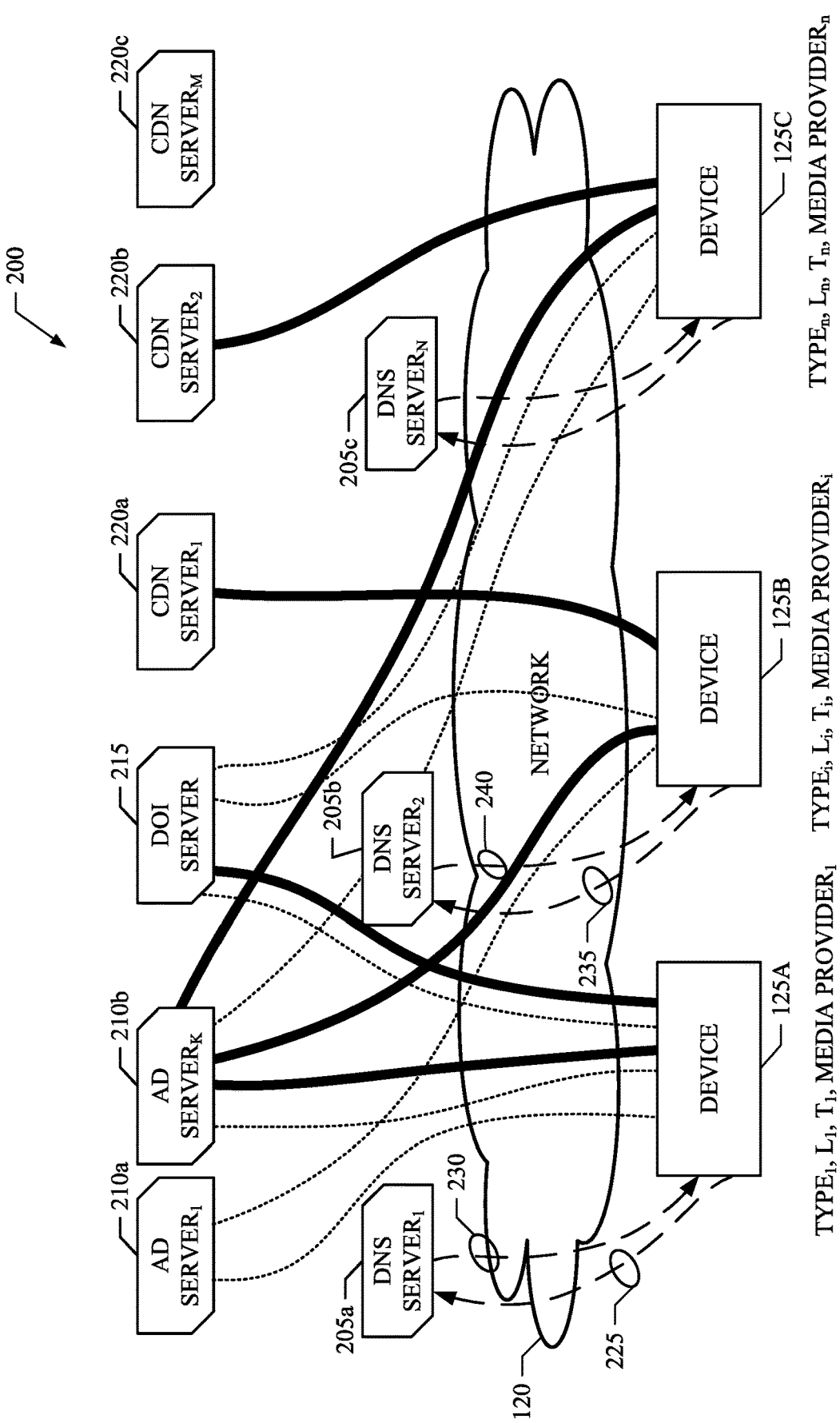
FIG. 2 illustrates an example network traffic environment depicting the network traffic between devices of the example media environment of FIG. 1 and example servers.

FIG. 2 illustrates an example network traffic environment 200 depicting the network traffic between devices 125A, 125B, and/or 125C and different servers. The example network traffic environment 200 includes example domain name system (DNS) servers 205a, 205b, and 205c, example advertisement (ad) servers 210a and 210b, an example domain of interest (DOI) server 215, and example content delivery network (CDN) servers 220a, 220b, and 220c.

In the illustrated example of FIG. 2, the example DNS servers 205a, 205b, and 205c are servers that provide the example devices 125A, 125B, and 125C with an IP address corresponding to a domain name indicated in a request for media including, for example, streaming media. For example, first device 125A requests media from "www.youtube.com" by sending a first request 225 to the example first DNS server 205a. The example first DNS server 205a identifies an IP address corresponding to the domain name "youtube.com" of the first request 225. The example first DNS server 205a sends a first response 230, including the IP address, to the example first device 125A. The example first device 125A utilizes the IP address to communicate with media providing servers to access the desired media (e.g., the desired streaming data/content).

In the illustrated example of FIG. 2, the example ad servers 210a, 210b manage and run online advertising campaigns. For example, the ad servers 210a, 210b make instantaneous decisions about what ads to serve to the example devices 125A, 125B, and 125C. In some examples, the ad servers 210a, 210b make decisions about what ads to serve to the devices 125A, 125B, and 125C that correspond to media/content (e.g., streaming media, streaming data, etc.) delivered by the example DOI server 215. In some examples, the ad servers 210a, 210b serve low bandwidth data (e.g., an advertisement that does not require a large amount of bandwidth to be transmitted to the devices). In other examples, the ad servers 210a, 210b serve high bandwidth data (e.g., advertisements that require and/or use a large amount of bandwidth to be transmitted to the devices). In the illustrated example of FIG. 2, the devices 125A, 125B, 125C receive low bandwidth advertisement data, represented by the dotted lines connecting the devices 125A, 125B, 125C to the ad servers 210a, 210b. In the illustrated example of FIG. 2, the devices 125A, 125B, 125C receive high bandwidth advertisement data, represented by the heavy weighted solid lines connecting the devices 125A, 125B, 125C to AD SERVER$_K$, i.e., the ad server 210b.

In the illustrated example of FIG. 2, the example DOI server 215 provides media, content, and/or data (e.g., streaming media, reroute data, etc.) to the example devices 125A, 125B, 125C using the example media provider 110 of FIG. 1. For example, upon request from the devices 125A, 125B, and/or 125C, the DOI server 215 provides the data indicated in the request to the media provider 110, in which the media provider 110 transmits the data to the devices 125A, 125B, 125C. The example devices 125A, 125B, and 125C obtain the IP address of the example DOI server 215 from the DNS servers 205a, 205b. For example, the first DNS server 205a sends the IP address, via the first response 230, to the first device 125A. In this manner, the example first device 125A uses the IP address to send a request to the example DOI server 215 for data (e.g., video data, image data, streaming data, etc.).

In some examples, the DOI server 215 sends high bandwidth data (e.g., indicated by the heavy weighted line) to the example devices 125A, 125B, 125C via the media provider. For example, the DOI server 215 provides requested media to the devices 125A, 125B, and/or 125C. In some examples, the DOI server 215 sends low bandwidth data (e.g., indicated by the dotted line) to the example devices 125A, 125B, 125C via the media provider. For example, the DOI server 215 sends instructions to the devices 125A, 125B, 125C. For example, the DOI server 215 may send instructions to the first device 125A to request a particular URL and/or IP address from a different server. In such an example, the URL and/or IP address may include a domain name indicative of one of the ad servers 210a, 210b. In other examples, the DOI URL and/or IP address includes a domain name indicative of a CDN server, such as at least one of the CDN servers 220a, 220b, 220c.

In the illustrated example of FIG. 2, the example CDN servers 220a, 220b, 220c deliver requested media to the example devices 125A, 125B, 125C. A CDN server is a system of distributed servers that deliver pages and other web content to a user (e.g., the panelists of the media environment 105), based on the geographic locations of the user, the origin of the webpage, and the content delivery server. A CDN enables quick transfer of assets needed for loading Internet content including HTML pages, javascript files, stylesheets, images, and videos. Due to the high demand for streaming content, the majority of streaming traffic is served through CDNs servers, including traffic from major sites (e.g., sites of interest, domains of interest (DOI), etc.) like Facebook®, Netflix®, and Amazon®. In such examples, when the DOI server 215 meets full capacity of bandwidth or identifies an advantage of the CDN, the devices 125A, 125B, 125C are instructed to request content from at least one of the CDN servers 220a, 220b, 220c.

In an example operation, the second device 125B sends a second request 235 to the second DNS server 205b. The example second device 125B is a device type i (e.g., a mobile phone), located at location i (e.g., the location of the media environment 105 of FIG. 1), utilizes media provider i (e.g., the media provider 110 of FIG. 1), and sends the second request 235 at time i. The second request 235 includes a URL "https://DOI/Dir&Par," wherein https is the protocol, DOI is the domain of interest, Dir is the directory of the server, and Par is the parameter(s) of the requested data. In some examples, a data monitor (e.g., the data monitor 140 of FIG. 1) can access and/or observe (e.g., identify) the protocol and the domain of interest of the second request 235, but not the directory and parameters. The example second DNS server 205b determines the IP address for the domain of interest (e.g., DOI server 215) of the second request 235 and responds to the second request with a second response 240.

The example second device 125B obtains the second response 240, including the IP address for the DOI, and re-routes the second request 235 for data to the DOI server 215. At time i, the example DOI server 215 cannot serve data to the example second device 125B (e.g., the DOI server 215 is at maximum bandwidth capacity, latency is high, etc.). The example DOI server 215 provides an instruction(s) to the example second device 125B including a URL and/or IP address for the first CDN server 220a. For example, the DOI server 215 instructs the second device 125B to request data from the first CDN server 220a. In such an example, the second CDN server 220a renders (e.g., streams) the data to the second device 125B.

In some examples, the first CDN server 220a sends instructions to the second device 125B. For example, the first CDN server 220a provides a URL to the second device 125B, indicative of the domain name of first ad server 210a, for the second device 125B to request an advertisement from the first ad server 210a. In the illustrated example of FIG. 2, the second device 125B requests a low bandwidth advertisement from the first ad server 210a. Additionally, the example CDN server 220a provides a different URL to the second device 125B, indicative of the domain name of the second ad server 210b, for the second device 125B to request an advertisement from the second ad server 210b. In the illustrated example of FIG. 2, the second device 125B requests a high bandwidth advertisement from the second ad server 210b.

In the example operation described above, the second device 125B obtains and transmits a plurality of requests (e.g., URLs) to and from a plurality of different servers (e.g., the second DNS server 205b, the DOI server 215, the first and second ad servers 210a, 210b, and the first CDN server 220a). In some examples, if the location i of the second device 125B is equal to the location of the media environment 105 of FIG. 1, then the example data monitor 140 of FIG. 1, coupled to the network 120, obtains the plurality of requests. Additionally, the example data monitor 140 obtains the time i and the media provider i of the request. For example, the data monitor 140 can identify the time at which the second request 235 was executed by the second device 125B.

In some examples, the plurality of requests generated for the execution of the second request 235 varies based on device type, location, time, and media provider. For example, the first request 225 of the first device 125A may include information to retrieve the same data (e.g., a request to watch the same video on YouTube®) as the second request 235 of the second device 125B, but the pattern of requests generated, obtained, transmitted, and/or executed are different, as illustrated in FIG. 2. In some examples, when the types of devices (e.g., mobile phone, tablet, laptop, television, etc.) are similar, but the times of request and the locations are different, the network traffic pattern (e.g., the requests obtained and/or transmitted during execution of the first request 225 and the second request 235) will be different.

The illustrated example of FIG. 2 is not limited to the number of devices and servers shown. In some examples, network traffic environment 200 includes fewer devices and fewer servers than illustrated. In other examples, network traffic environment 200 includes a plurality of DOI servers, a plurality of CDN servers per DOI server, and a plurality of ad servers. Additionally, the example network traffic environment 200 may include a greater number of devices shown.

FIG. 3 is a block diagram of the example meter 130 of FIG. 1 to collect monitoring information (e.g., media identification, an identifier of a panelist, a timestamp of the time of the presentation) of the presented media and generate exposure data. The example meter 130 includes an example context collection controller 305, an example panelist collection controller 310, an example domain pattern signature generator 315, an example data store 320, and an example network communication processor 325.

In the illustrated example of FIG. 3, the context collection controller 305 obtains network traffic data from the example data monitor 140 of FIG. 1. For example, the context collection controller 305 is communicatively coupled to the data monitor 140. In some examples, the context collection controller 305 obtains network traffic of the media environment 105 of FIG. 1. For example, the data monitor 140 obtains packet data when devices (e.g., devices 125A, 125B, 125C) send and/or receive packet data via the network device 135 of FIG. 1. When a device (e.g., 125A, 125B, 125C) renders a page (e.g., a website page, a streaming media page, etc.), the device (e.g., 125A, 125B, 125C) downloads and/or loads additional data, such as scripts, data associated with advertisements (ads), etc., in addition to the streaming page data. When the device (e.g., 125A, 125B, 125C) loads additional data (e.g., scripts and ads), network traffic is created. In some examples, context collection controller 305 collects the destinations, sources, IP addresses, and bandwidths of such network traffic.

In some examples, the context collection controller 305 obtains such packet data from the data monitor 140. The example context collection controller 305 identifies a set of domain requests from the network traffic. For example, the context collection controller 305 extracts a set of URLs generated, transmitted, etc., during the first request 225 of FIG. 2. Additionally, the example context collection controller 305 identifies the first request 225.

In some examples, when the context collection controller 305 obtains a set of domain requests, the context collection controller 305 identifies the device associated with the domain requests. For example, the context collection controller 305 can identify a device identifier associated with the domain requests, such as, for example, a source address. The source address is a portion of the domain requests indicating an IP address of the object sending the domain requests. For example, in a transmission control protocol (TCP)/IP packet of data, the source address of the data is located in the header of the packet of data. Additionally, the destination address (e.g., the domain name) is located in the header of the packet of data. Thus, to identify the device associated with the domain requests, the example context collection controller 305 identifies the source of the domain requests, because the source is the object (e.g., device) making the request. The example context collection controller 305 provides the set of domain requests and the device identifiers to the example domain pattern signature generator 315.

In some examples, the context collection controller 305 is implemented by the central facility 170. For example, the context collection controller 305 is not included in the example meter 130. In such an example, the data monitor 140 is communicatively coupled to the central facility 170 and the meter 130 does not receive or obtain packet data and/or network traffic data.

In the illustrated example of FIG. 3, the example panelist collection controller 310 obtains panelist data from the example devices 125A, 125B, 125C of FIG. 1. The example panelist collection controller 310 is communicatively coupled to the example devices (e.g., devices 125A, 125B, 125C) of the example media environment 105. The example panelist collection controller 310 receives user identifying information (e.g., demographic information for a user(s) of the device 125A, 125B, 125C). The example panelist collection controller 310 may obtain a panelist identifier from the example devices 125A, 125B, 125C when the example devices 125A, 125B, 125C transmit a request. In some examples, the panelist collection controller 310 obtains user identifying information each time the devices 125A, 125B, 125C request media. In some examples, the panelist collection controller 310 provides the user identifying information (e.g., panelist data) to the example domain pattern signature generator 315. In some examples, the panelist collection controller 310 is implemented by a people meter that collects panelist identifiers.

In the illustrated example of FIG. 3, the example domain pattern signature generator 315 generates domain pattern signatures based on network traffic data, media provider (e.g., ISP), location (e.g., MMS location), time, and panelist data. For example, the domain pattern signature generator 315 obtains sets of domain requests from the context collection controller 305 and obtains panelist data from the panelist collection controller 310. The example domain pattern signature generator 315 utilizes the sets of domain requests and the panelist data to generate the domain pattern signature. In some examples, the domain pattern signature generator does not utilize panelist data to generate domain pattern signatures. As used herein, a domain pattern signature is a unique vector, matrix, image, text string, etc., that corresponds to a domain request from a device type, at a location, at a time, and from a media provider. In some examples, the domain pattern signature generator 315 concatenates domain names from a set of domains with panelist data, time, device type, location, and media provider.

For example, the first device 125A sends the first request 225 (FIG. 2) including URL "www.youtube.com." In this example, the URL "https://www.youtube.com/watch=data" is the domain request. In some examples, the URL "www.youtube.com/watch=data" can be referred to as the domain of interest (DOI) request. The example context collection controller 305 obtains the protocol and domain name of the DOI request (e.g., https and www.youtube.com) and provides the protocol and domain name to the example domain pattern signature generator 315. Additionally, the example first device 125A receives and transmits a plurality of associated HTTP requests, which are collected by the example context collection controller 315 as a set of domain requests. For example, the set of domain requests corresponds and/or are otherwise generated based on the DOI request. The set of domain requests may include advertisement server requests, CDN server requests, scripts requests, etc.

In some examples, the domain pattern signature generator 315 concatenates the DOI request with the set of domain requests. For example, the domain pattern signature generator 315 appends the domain names of the set of domain requests to the domain name of the DOI request. In some examples, the domain pattern signature generator 315 appends both the protocols and the domain names of the set of the domain requests to the protocol and domain name of the DOI request. In such examples, the set of domain requests combined with the DOI request form the domain pattern signature. In other examples, if the context collection controller 305 has not identified the DOI request, the domain pattern signature generator 315 concatenates the set of domain requests corresponding to the device to generate the domain pattern signature. For example, the context collection controller 305 may not be able to immediately identify a DOI request in a large collection of network traffic data. In such an example, the context collection controller 305 identifies domain requests having the same source and destination address. In some examples, the context collection controller 305 utilizes timestamps of the data packets (e.g., requests) to associate (e.g., correlate) the domain sets as being a result of a single DOI request.

In some examples, the domain pattern signature generator 315 identifies user identifying information in the DOI request (e.g., a username, a password, a cookie, etc.). Additionally and/or alternatively, the example domain pattern signature generator 315 obtains user identifying information from the example panelist collection controller 310. In this manner, the example domain pattern signature generator 315 inserts and/or concatenates the user identifying information with the domain pattern signature. For example, the domain pattern signature generator 315 may include the user identifying information as metadata for the domain pattern signature. The example domain pattern signature generator 315 identifies the time, location, and device type corresponding to the DOI request. For example, the domain pattern signature generator 315 analyzes the DOI request for a timestamp and a source or origin of request. In such an example, the domain pattern signature generator 315 tags the domain pattern signature with the example timestamp and source or origin of the DOI request.

In some examples, the domain pattern signature generator 315 stores the domain pattern signature in the example data store 320. In some examples, the domain pattern signature generator 315 stores a plurality of domain pattern signatures in the data store 320. In some examples, the domain pattern signature generator 315 stores domain pattern signatures in the data store 320 with corresponding panelist demographics. For example, the domain pattern signature generator 315 associates (e.g., correlates) a domain pattern signature with a panelist demographic based on the user identifying information.

Additionally or alternatively, the example central facility 170 implements the example domain pattern signature generator 315. For example, the meter 130 may not include the domain pattern signature generator 315. In such an example, the context collection controller 305 and the domain pattern signature generator 315 may be implemented by the central facility 170. In some examples, the meter 130 includes the panelist collection controller 310 to obtain panelist data and store the panelist data in the example data store 320. Further, the data store 320 provides the panelist data, via the network communication processor 325 and network device 135 (FIG. 1), to the example domain pattern signature generator 315 while the context collection controller 305 provides packet data and/or network traffic data to the example domain pattern signature generator 315. In this manner, the example central facility 170 (e.g., the context collection controller 305 and the domain pattern signature generator 315) generates the domain pattern signatures in a manner as described in above examples.

In the illustrated example of FIG. 3, the example data store 320 stores records of media exposure data (e.g., ratings data) indicative of amount(s) and/or type(s) of people that were exposed to specific piece(s) of web media, streaming media, Internet media, etc., distributed via the media devices 125A, 125B, 125C. For example, the association (e.g., correlation) between the domain pattern signatures and the panelist demographics within the data store 320 create records of media exposure data. However, the domain pattern signatures stored in the example data store 320 are not credited. For example, the browser (e.g., the domain of interest) corresponding to a domain pattern signature is to be verified before the browser is credited. Such crediting is performed at the example central facility 170, described in further detail below in connection with FIG. 5. The data store 320 may be any device for storing data such as, for example, flash memory, magnetic media, optical media, etc. Furthermore, the data stored in the data store 320 may be in any data format such as, for example, binary data, comma delimited data, tab delimited data, structured query language (SQL) structures, etc. While in the illustrated example the data store 320 is illustrated as a single database, the data store 320 may be implemented by multiple databases.

Additionally or alternatively, the example data store 320 stores records of media exposure data without the correlation of panelist data and domain pattern signatures. For example, when the central facility 170 implements the context collection controller 305 and the domain pattern signature generator 315, the data store 320 stores records of panelist data obtained from the panelist collection controller 310.

In the illustrated example of FIG. 3, the example network communication processor 325 transmits the records located in the data store 320 to the central facility 170 via the network 120. For example, the network communication processor 325 packages records corresponding to the domain pattern signatures and panelist demographics and transmits records to the central facility 170. Additionally or alternatively, the example network communication processor 325 packages records corresponding to the panelist demographics and transmits the records to the example domain pattern signature generator 315 of the example central facility 170. In this manner, the domain pattern signature generator 315 obtains panelist data to enable the generation of a domain pattern signature.

Turning to FIG. 4, the illustrated example depicts a table 400 that may be representative of information stored and/or obtained by the example context collection controller 305 of FIG. 3. For example, FIG. 4 is representative of domain requests made by the example first device 125A and collected by the example data monitor 140 of FIG. 1. The example context collection controller 305 stores information corresponding to location (405), media provider type (410) (e.g., ISP), time (415), and visible domains (420).

In the illustrated example of FIG. 4, the location 405 corresponds to the location at which the example first device 125A sends a DOI request. For example, at row 425, the context collection controller 305 obtains location information corresponding to "OFFICE." In some examples, the "OFFICE" includes a media monitoring environment (e.g., media environment 105) and the media monitoring environment includes a physical address for the "OFFICE." Additionally, at row 435, the example context collection controller 305 obtains location information corresponding to "HOME." In some examples, the "HOME" includes a media monitoring environment (e.g., media environment 105) and the media monitoring environment includes a physical address for the "HOME."

In the illustrated example of FIG. 4, the media provider type 410 corresponds to the Internet Service Provider (ISP) utilized by the example first device 125A. For example, the first device 125A utilizes AT&T® for Internet and broadcasting data. Alternatively, the example first device 125A utilizes any other type of media provider different than AT&T®.

In the illustrated example of FIG. 4, the time 415 corresponds to the time the example first device 125A made a request. For example, the at the first row 425, the first device 125A made a request on Feb. 22, 2020, at 10:00 am. Additionally, at the second row 430, the example first device 125A made a request on Feb. 22, 2020, at 10:00 am. In some examples, the date represented in the table 400 is not utilized by the example domain pattern signature generator 315. For example, the domain pattern signature generator 315 utilizes the timestamp indicated in the first row 425 to generate the domain pattern signature but does not utilize the date. Alternatively, the example domain pattern signature generator 315 does utilizes the date in conjunction with the timestamp to generate the domain pattern signature.

In the illustrated example of FIG. 4, the visible domain 420 corresponds to the name of the URL (e.g., the DOI request and/or the set of domain requests) that the example data monitor 140 can extract and provide to the context collection controller 305. The visible portion of the URL request is indicative of the domain for which the request is intended for. Behind the URL address is an invisible data. The browser (e.g., a browser of the first device 125A) attaches invisible data such as a cookie corresponding to the panelist, search history corresponding to the panelist, directory and parameter information corresponding to the data requested, etc. The invisible data is a portion of the URL address that the example data monitor 140 cannot identify. For example, the invisible data is encrypted by the device (e.g., the first device 125A) and cannot be decrypted by the data monitor 140. In some examples, when a panelist operating the first device 125A submits an HTTP request in the browser indicative of youtube.com, the browser attaches the directory, parameters, and additional information to the HTTP request (e.g., https://m.youtube.com/watch?v=rPATy-tHjiI&t=40s). The example data monitor 140 identifies the domain name, https://m.youtube.com, from the HTTP request and provides it to the context collection controller 305.

At the first row 425, the first device 125A requests https://m.youtube.com from the OFFICE on Feb. 22, 2020, at 10:00 am. At the second row 430, the first device 125A additionally requests r6---sn-8xgp1vo-2ial.googlevideo.com from the OFFICE on Feb. 22, 2020, at 10:00 am. In the illustrated example, the visible domain of the first row 425 corresponds to the DOI request, and the visible domain of the second row 430 corresponds to an advertisement request (e.g., one of the domain requests in the set of domain requests).

In some examples, if the first device 125A requests https://m.youtube.com from the same location "OFFICE" at the same time of 10:00 am but on a different day, the resulting advertisement request, indicated as r6---sn-8xgp1vo-2ial.googlevideo.com in the second row 430, may be the same. Alternatively, depending on the browsing history of the first device a week or month later, the resulting advertisement request may be different for the time and location.

In the illustrated example of FIG. 4, the table 400 depicts that after each DOI request (e.g., the HTTP request https://m.youtube.com/), an advertisement request is made (e.g., the HTTP requests for googlevideo.com). In the illustrated example, the advertisement requests are different for the different times and different locations. However, as described above, the advertisement requests may be the same when the first device 125A requests data from the DOI at the same time and same location, but a different day. In this manner, the advertisement requests may be static per location, time, media provider, device type, and DOI request.

While an example manner of implementing the meter 130 of FIG. 1 is illustrated in FIG. 3, one or more of the elements, processes and/or devices illustrated in FIG. 3 may be combined, divided, re-arranged, omitted, eliminated and/or implemented in any other way. Further, the example context collection controller 305, the example panelist collection controller 310, the example domain pattern signature generator 315, the example network communication processor 325 and/or, more generally, the example meter 130 of FIG. 1 may be implemented by hardware, software, firmware and/or any combination of hardware, software and/or firmware. Thus, for example, any of the example context collection controller 305, the example panelist collection controller 310, the example domain pattern signature generator 315, the example network communication processor 325 and/or, more generally, the example meter 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example context collection controller 305, the example panelist collection controller 310, the example domain pattern signature generator 315, and/or the example network communication processor 325 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter 130 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
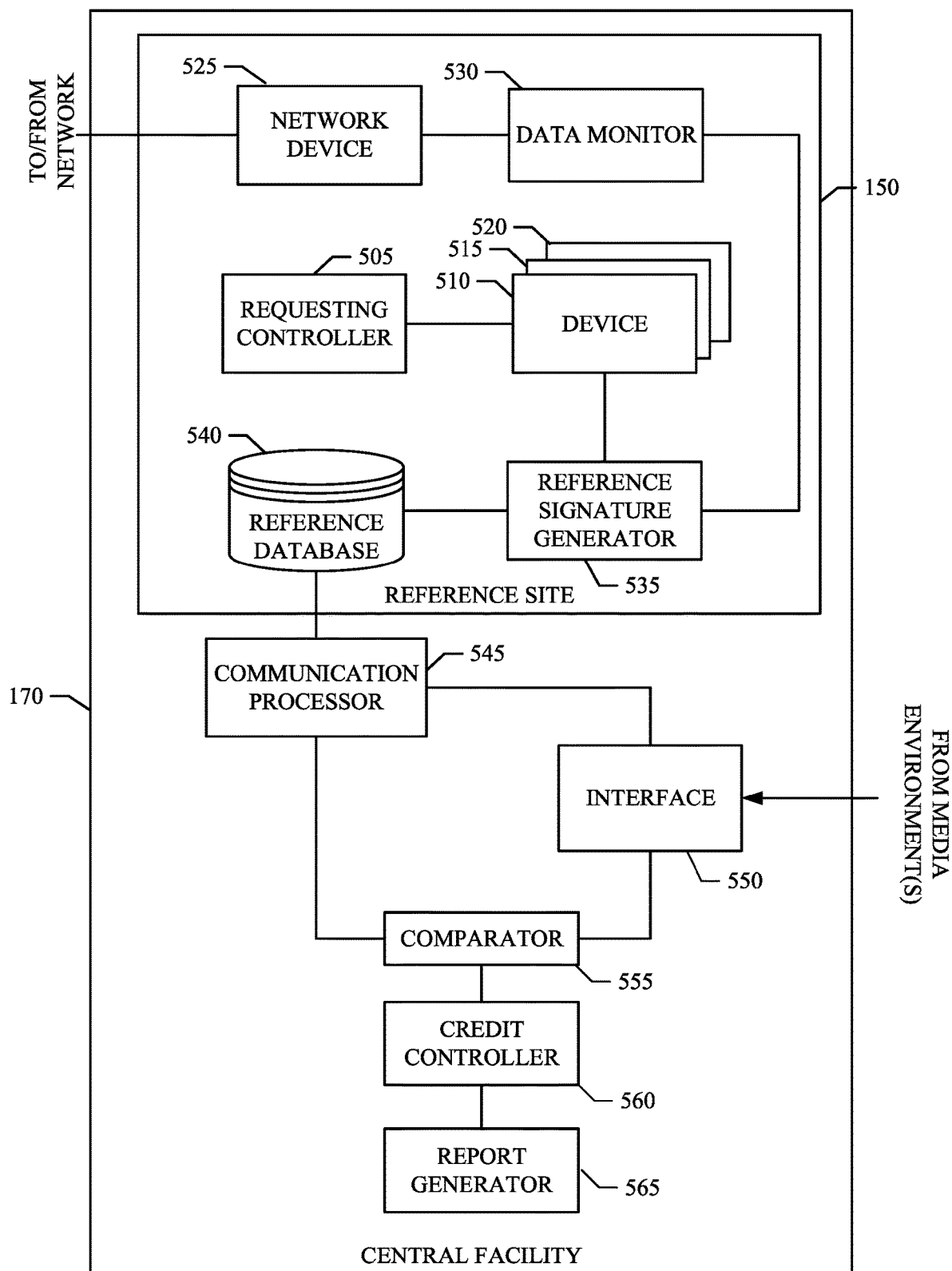
FIG. 5 illustrates an example central facility of FIG. 1 to generate reference signatures and credit sites of interest for media consumption or exposure data generated by the example meter of FIGS. 1 and 3.

FIG. 5 illustrates the example central facility 170 to generate reference signatures and credit domains (e.g., web servers, content providers, media stream services, etc.) for exposure data. The example central facility 170 includes the example reference site 150. The example reference site 150 includes an example requesting controller 505, example devices 510, 515, 520, an example network device 525, an example data monitor 530, an example reference signature generator 535, and an example reference database 540. The example central facility 170 further includes an example communication processor 545, an example interface 550, an example comparator 555, an example credit controller 560, and an example report generator 565. In some examples, the central facility 170 includes the example context collection controller 305 and the example domain pattern signature generator 315.

In the illustrated example of FIG. 5, the example requesting controller 505 triggers the example devices 510, 515, 520 to execute requests. Reference sites across different markets each use any available media providers (e.g., ISPs) at the market in addition to known device types to execute requests for generating and storing reference signatures. In some examples, the requesting controller 505 generates requests, such as HTTP requests. For example, the requesting controller 505 creates a URL for at least one of the devices 510, 515, and/or 520 to execute. In some examples, the requests generated by the requesting controller 505 are predetermined requests corresponding to specific site of interest (e.g., domain of interest, web servers, streaming media services, etc.). For example, the requesting controller 505 generates a request in which the site of interest, and/or otherwise referred to as the domain of interest, is Netflix®. In such an example, the requesting controller 505 provides the request to at least one or more of the devices 510, 515, 520. The at least one or more of devices 510 obtain the request and request the data from the site of interest (e.g., Netflix®).

The example requesting controller 505 may be controlled by a list generated by an administrator of the example central facility 170. For example, the administrator may be a human operator, a machine learning algorithm implemented by a computer, etc. The administrator generates requests for sites of interest in an effort to monitor the network traffic pattern (e.g., obtain the sets of domains) for that site of interest. In some examples, the request for data from a site of interest can render a plurality of different network traffic patterns (e.g., a plurality of different sets of domains). For example, if the first device 510 is a mobile phone, and the second device 515 is a laptop, the network traffic pattern may include different sets of domain requests, even though the original request for data (e.g., the DOI request) is the same. Therefore, the example requesting controller 505 determines a plurality of sites of interest and generates a plurality of DOI requests corresponding to the sites of interest.

In some examples, network traffic patterns (e.g., the sets of domains) may vary based on the time for which the devices 510, 515, 520 executed the DOI requests. In this manner, the example requesting controller 505 periodically provides the DOI requests to the devices 510, 515, 520 in an effort to monitor the network traffic patterns for a plurality of times. Additionally, in some examples, the network traffic patterns (e.g., the sets of domains) may vary depending on the type of media provider (e.g., Internet service provider) servicing the devices 510, 515, 520. In some examples, the first device 510 utilizes a different media provider than the second and third devices 515, 520. In some examples, the central facility 170 includes a plurality of devices, each of which utilize services from different media providers.

In the illustrated example of FIG. 5, the example devices 510, 515, 520 execute DOI requests provided by the example requesting controller 505. In some examples, the devices 510, 515, 520 are media devices that retrieve media from the example media provider 110 for presentation. For example, the devices 510, 515, 520 are consumer electronics located within the central facility 170. In such an examples, the devices 510, 515, 520 could be a personal computer such as a laptop computer, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. Alternatively, the example devices 510, 515, 520 are virtualized hardware and/or software resources operating in a cloud environment, such as virtual machines, containers, etc. In such examples, the devices 510, 515, 520 simulate consumer electronics, such as the consumer electronics described above, and the rendering of textual, audible, and/or visual media is not of importance when the devices 510, 515, 520 simulate the consumer electronics. Additionally and/or alternatively, the example devices 510, 515, 520 are edge devices, such as IoT devices, Internet-enabled tablets, mobile handsets (e.g., smartphones), watches (e.g., smartwatches), fitness trackers, headsets, vehicle control units (e.g., an engine control unit, an electronic control unit, etc.), etc. In some examples, the devices 510, 515, 520 can include hardware and/or software resources, virtualizations of the hardware and/or software resources, containerization of virtualized or non-virtualized hardware and software resources, etc., and/or a combination thereof.

In the illustrated example of FIG. 5, the example network device 525 enables the example devices 510, 515, 520 in the central facility 170 to communicate with the network 120 (e.g., the Internet). In some examples, the network device 525 is a router. Alternatively or additionally, the example network device 525 is a gateway, a modem, a network bridge, etc. In some examples, the central facility 170 includes at least two or more network devices 525. In such an example, the central facility 170 includes at least two or more data monitors 530.

In the illustrated example of FIG. 5, the example data monitor 530 collects network traffic in the example central facility 170. The example data monitor 530 monitors network communications in the example central facility 170 to collect the network traffic. For example, the data monitor 530 may operate as a packet sniffer, may operate as a proxy server, may query an application programming interface (API) of operating systems of the devices 510, 515, 520, may communicate with the example network device 525, communicatively coupled to the devices 510, 515, 520 (e.g., a router, a switch, a gateway, a firewall, etc.), and/or may obtain network data in any other manner. In some examples, the data monitor 530 collects data corresponding to the network traffic in a similar manner to the data monitor 140 of the media environment 105 illustrated in FIG. 1. For example, the data monitor 530 obtains sets of domain requests generated per DOI request. Additionally, the example data monitor 530 may obtain information about the device(s) executing the DOI request and the sets of domain requests.

For example, the data monitor 530 retrieves packets of data that are received by the example network device 525. In other words, a device requesting data from a server in the network 120 utilizes the network device 525. Therefore, the example network device 525 obtains packets of data coming to and leaving from such a device. In this manner, the example data monitor 530 obtains the packets of data that the network device 525 obtained. As used herein, a packet of data is a small amount of data sent over the network 120 including a source, destination, and content (e.g., the data). In some examples, the packets of data are indicative of a URL, and therefore a request. The example data monitor 530 is communicatively coupled to the example reference signature generator 535. The example data monitor 530 provides collected network traffic to the example reference signature generator 535.

In the illustrated example of FIG. 5, the example reference signature generator 535 generates reference signatures based on network traffic data obtained from the example data monitor 530. The example reference signature generator 535 is communicatively coupled to the example data monitor 530, the example devices 510, 515, 520, and the example reference database 540. The example reference signature generator 535 generates signatures representative of patterns of network traffic during a DOI request. For example, the reference signature generator 535 concatenates a main DOI request with a set of domain requests to generate the reference signature. Further, the example reference signature generator 535 tags the reference signatures with identifying information, such as, for example, device type, location, media provider, time, bandwidth, and/or the DOI. In such an example, the reference signatures are different with respect to the domain pattern signatures because the reference signatures include a known site of interest (e.g., DOI).

For example, the reference signature generator 535 may obtain the site of interest from the devices executing the DOI request. The example requesting controller 505 provides the site of interest to the example devices 510, 515, 520 when the requesting controller configures the devices 510, 515, 520 to execute a DOI request. In such examples, the devices 510, 515, 520 include memory and/or other storage devices that store the site of interest in association with the DOI request. In such an example, the site of interest and the DOI request may be stored in the devices 510, 515, 520 with a timestamp. In such an example, the reference signature generator 535 obtains the site of interest associated with the DOI request and the timestamp and makes an association (e.g., correlation) between the set of domain requests and the site of interest. Thus, the example reference signature generator 535 generates reference signatures with a known site of interest.

The example reference signature generator 535 generates a plurality of reference signatures based on the plurality of DOI requests generated by the example requesting controller 505. For example, it is beneficial to generate multiple scenarios for multiple sites of interest. The example requesting controller 505 may determine a first scenario for a site of interest by generating a request for data from Netflix®, configured to be executed by the first device 510 at 10:00 pm. Additionally, the example requesting controller may determine a second scenario for a site of interest by generating a request for data from Netflix®, configured to be executed by the first device 510 at 11:00 am. The examples and scenarios continue for different times, different sites of interest, different media providers (e.g., ISPs), and different devices. Therefore, the example reference signature generator 535 generates reference signatures representative of the results of these multiple examples and scenarios. The example reference signature generator 535 stores the reference signatures in the example reference database 540.

In the illustrated example of FIG. 5, the example reference database 540 stores reference signatures for subsequent use by the example comparator 555. The example reference database 540 may be any device for storing data such as, for example, flash memory, magnetic media, optical media, etc. Furthermore, the data stored in the reference database 540 may be in any data format such as, for example, binary data, comma delimited data, tab delimited data, structured query language (SQL) structures, etc. While in the illustrated example the reference database 540 is illustrated as a single database, the reference database 540 may be implemented by multiple databases.

In the illustrated example of FIG. 5, the central facility 170 includes the example communication processor 545 to obtain reference signatures from the example reference database 540. In some examples, when the central facility 170 does not implement the reference site 150, the example communication processor 545 extracts reference signatures from the reference database 540 via the network 120. The example communication processor 545 provides reference signatures to the example comparator 555. In some examples, the communication processor 545 is communicatively coupled to the example interface 550. In such an example, the interface 550 notifies the communication processor 545 to obtain one or more reference signatures from the reference database 540. For example, the interface 550 receives domain pattern signatures from the media environment 105, and more particularly, the network communication processor 325 of FIG. 3. In response to receiving domain pattern signatures, the example interface 550 instructs the example communication processor 545 to obtain and/or otherwise query the example reference database 540 for matching reference signatures.

In the illustrated example of FIG. 5, the central facility 170 includes the example interface 550 to obtain domain pattern signatures from the media environment 105 (FIG. 1). In some examples, when the central facility 170 implements the context collection controller 305 and the domain pattern signature generator 315, the interface 550 obtains panelist data from the network communication processor 325 (FIG. 3) and packet data from the data monitor 140. The example interface 550 may be implemented by a transceiver. In some examples, the interface 550 is coupled to the communication processor 545, the comparator 555, and the network 120. In some examples, the interface 550 may be a communication interface, such as a smart network interface controller (NIC), an application programming interface (API), etc.

In some examples, the interface 550 sends instructions to the example communication processor 545. For example, the interface 550 instructs the communication processor 545 to obtain reference signatures from the reference database 540. For example, the interface 550 instructs the communication processor 545 to perform a query for reference signatures having the same device type as the domain pattern signature, the same location as the domain pattern signature, the same ISP as the domain pattern signature, and/or having a timestamp closest to a specified timestamp (e.g., the timestamp of the domain pattern signature). In such an example, the reference database 540 may return a list of one or more reference signatures having the same location, ISP, device type, and similar timestamp as the domain pattern signature.

In other examples, the interface 550 sends instructions to the example comparator 555. For example, the interface 550 instructs the comparator 555 to compare characteristics of a domain pattern signature with characteristics of a reference signature obtained from the query. In this manner, the example interface 550 provides the domain pattern signature to the example comparator 555.

In examples where the interface 550 obtains packet data directly from the data monitor 140, the interface 550 provides the packet data to the context collection controller 305. In such an example, the data monitor 140 of the media environment 105 (FIG. 1) is communicatively coupled to the interface 550.

In some examples, if the interface 550 provides network traffic data to the context collection controller 305, the context collection controller 305 determines domain patterns and provides the domain patterns to the domain pattern signature generator 315. Therefore, the example domain pattern signature generator 315 can generate domain pattern signatures based on the domain patterns. In such examples, the domain pattern signature generator 315 instructs the communication processor 545 to query the reference database 540 for reference signatures similar to the domain pattern signature. Additionally, in such examples, the domain pattern signature generator 315 instructs the comparator 555 compare characteristics of a domain pattern signature with characteristics of a reference signature obtained from the query.

In the illustrated example of FIG. 5, the central facility 170 includes the example comparator 555 to determine a match between domain pattern signatures and reference signatures. The example comparator 555 may obtain reference signatures from the example communication processor 545 and domain pattern signatures from the example interface 550. Additionally and/or alternatively, the example comparator 555 may obtain domain pattern signatures from the example domain pattern signature generator 315 rather than the interface 550. The example comparator 555 obtains a list of reference signatures returned by the reference database 540 and compares the first reference signature in the list to the domain pattern signature. In some examples, when a reference signature does not match the domain pattern signature, the communication processor 545 is instructed to fetch the next reference signature in the list. In some examples, the comparator 555 notifies the communication processor 545 when a reference signature does not match the domain pattern signature.

In some examples, the comparator 555 compares the two sets of domains included in the two signatures (e.g., the domain pattern signature and the reference signature). In some examples, the comparator 555 compares the device types indicated in the two signatures. In some examples, the comparator 555 compares the time and location indicated in the two signatures (e.g., the domain pattern signature and the reference signature). In some examples, the comparator 555 compares the media provider corresponding to the two signatures (e.g., the domain pattern signature and the reference signature). In some examples, the comparator 555 compares a combination of the sets of domains, the device types, the time and location, and the media provider of the two signatures (e.g., the domain pattern signature and the reference signature).

The comparator 555 may identify a match between a domain pattern signature and a reference signature when the sets of domains, the time, and the locations match. Additionally, the comparator 555 may identify a match between a domain pattern signature and a reference signature when the sets of domains, the device type, bandwidth size, and the media provider match. Additionally, the example comparator 555 may identify a match when a combination of the information (e.g., features) corresponding to the reference signature is the same as the information (e.g., features) corresponding to the domain pattern signature. When the example comparator 555 identifies a match between the domain pattern signature and the reference signature, the example comparator 555 notifies the example credit controller 560. In some examples, the comparator 555 passes the reference signature and the domain pattern signature to the credit controller 560.

In some examples, the comparator 555 need not perform the comparison due to the function of the query by the communication processor 545 (e.g., when the communication processor 545 queries the reference database 540). For example, the communication processor 545 may identify a reference signature matching the domain pattern signature while querying the reference database 540. In such an example, the comparator 555 does not receive instructions to compare reference signatures to the domain pattern signature.

In some examples, the comparator 555 identifies media viewed by the panelist based on the comparison between the domain pattern signature and the reference signature. For example, the reference signature includes media identifying metadata (e.g., song title, video title, podcast title, broadcast channel, etc.) corresponding to the media (e.g., Internet content, downloaded media, etc.). If the comparison is indicative of a match, the comparator 555 notifies the example credit controller 560 of the media identifying metadata for which the domain pattern signature includes and/or is indicative of.

In the illustrated example of FIG. 5, the central facility 170 includes the example credit controller 560 to credit domain pattern signatures with a site of interest. The example credit controller 560 is communicatively coupled to the example comparator 555 and the example report generator 565. The example credit controller 560 obtains information from the example comparator 555. For example, the credit controller 560 is notified if the domain pattern signature matched a reference signature. When a domain pattern signature matches a reference signature, the example credit controller 560 identifies the site of interest corresponding to the reference signature. For example, the credit controller 560 extracts the metadata from the reference signature indicative of the site of interest. Further, the example credit controller 560 credits the domain pattern signature with the site of interest. For example, the credit controller 560 correlates, tags, appends, etc., the site of interest to the domain pattern signature. In such an example, the credit controller 560 verifies (e.g., by tagging, correlating, associating, appending) that the domain pattern signature can be utilized as media exposure or consumption data. In such an example, the credit controller 560 provides the credited domain pattern signature to the example report generator 565 for generation of media exposure or consumption data.

In the illustrated example of FIG. 5, the central facility 170 includes the example report generator 565 to generate reports indicative of media exposure data based on panelist demographics and credited domain pattern signatures. For example, the report generator 565 associates (e.g., correlates) the panelist demographics of the domain pattern signature with the site of interest of the domain pattern signature and generates a report based on these statistics. In some examples, the report generator 565 compiles media exposure data based on domain pattern signature crediting performed by the credit controller 560. A report is then generated to indicate exposure to sites of interest and consumption of the media presented on the sites of interest. In some examples, the media exposure or consumption data provide ratings information for different sites of interest.

By utilizing reference signatures generated by the reference signature generator 535, the error that results from crediting a site of interest once and then assuming the same for future observations is minimized. For example, a video content is provided by two Internet sites, site A and site B. Conventionally, if site A provides the video content having the highest amount of bandwidth, then site A is credited. In future observations, if the same video content is rendered, site A is automatically credited. However, this is in error because site B may have been the Internet site that provided the video content. In this manner, a conventional credit controller cannot credit site A or site B correctly based solely on the video content because the content is common to both sites. Therefore, the reference signatures provide a means for efficiently and accurately crediting Internet/network consumption to sites of interest.

Additionally, by utilizing reference signatures generated by the reference signature generator 535, a consumption of any DOI site (e.g., Internet site) will be automatically credited to the site due to the matching between the reference signature and the domain pattern signature. In some examples, a consumption of media provided by an outside DOI site is ignored or credited to a special category. As used herein, an outside DOI site is an Internet site that does not request ratings data. For example, random Internet sites that do not rely on media ratings and/or advertisements do not need the example central facility 170 to credit media consumption to their site. Conventionally, when analysts manually analyzed traffic patterns to identify DOIs, the analysts identified DOIs that were outside DOIs. Such an identification would have been wasteful. Thus, examples disclosed herein provide an efficient and beneficial method to credit DOIs without wasting time on analyzing outside DOIs.

While an example manner of implementing the central facility 170 of FIG. 1 is illustrated in FIG. 5, one or more of the elements, processes and/or devices illustrated in FIG. 5 may be combined, divided, re-arranged, omitted, eliminated and/or implemented in any other way. Further, the example context collection controller 305, the example domain pattern signature generator 315, the example reference site 150, the example requesting controller 505, the example first device 510, the example second device 515, the example third device 520, the example network device 525, the example data monitor 530, the example reference signature generator 535, the example communication processor 545, the example interface 550, the example comparator 555, the example credit controller 560, the example report generator 565, and/or, more generally, the example central facility 170 of FIG. 5 may be implemented by hardware, software, firmware and/or any combination of hardware, software and/or firmware. Thus, for example, any of the example context collection controller 305, the example domain pattern signature generator 315, the example reference site 150, the example requesting controller 505, the example first device 510, the example second device 515, the example third device 520, the example network device 525, the example data monitor 530, the example reference signature generator 535, the example communication processor 545, the example interface 550, the example comparator 555, the example credit controller 560, the example report generator 565, and/or, more generally, the example central facility 170 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example context collection controller 305, the example domain pattern signature generator 315, the example reference site 150, the example requesting controller 505, the example first device 510, the example second device 515, the example third device 520, the example network device 525, the example data monitor 530, the example reference signature generator 535, the example communication processor 545, the example interface 550, the example comparator 555, the example credit controller 560, and/or the example report generator 565 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 170 of FIGS. 1 and 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
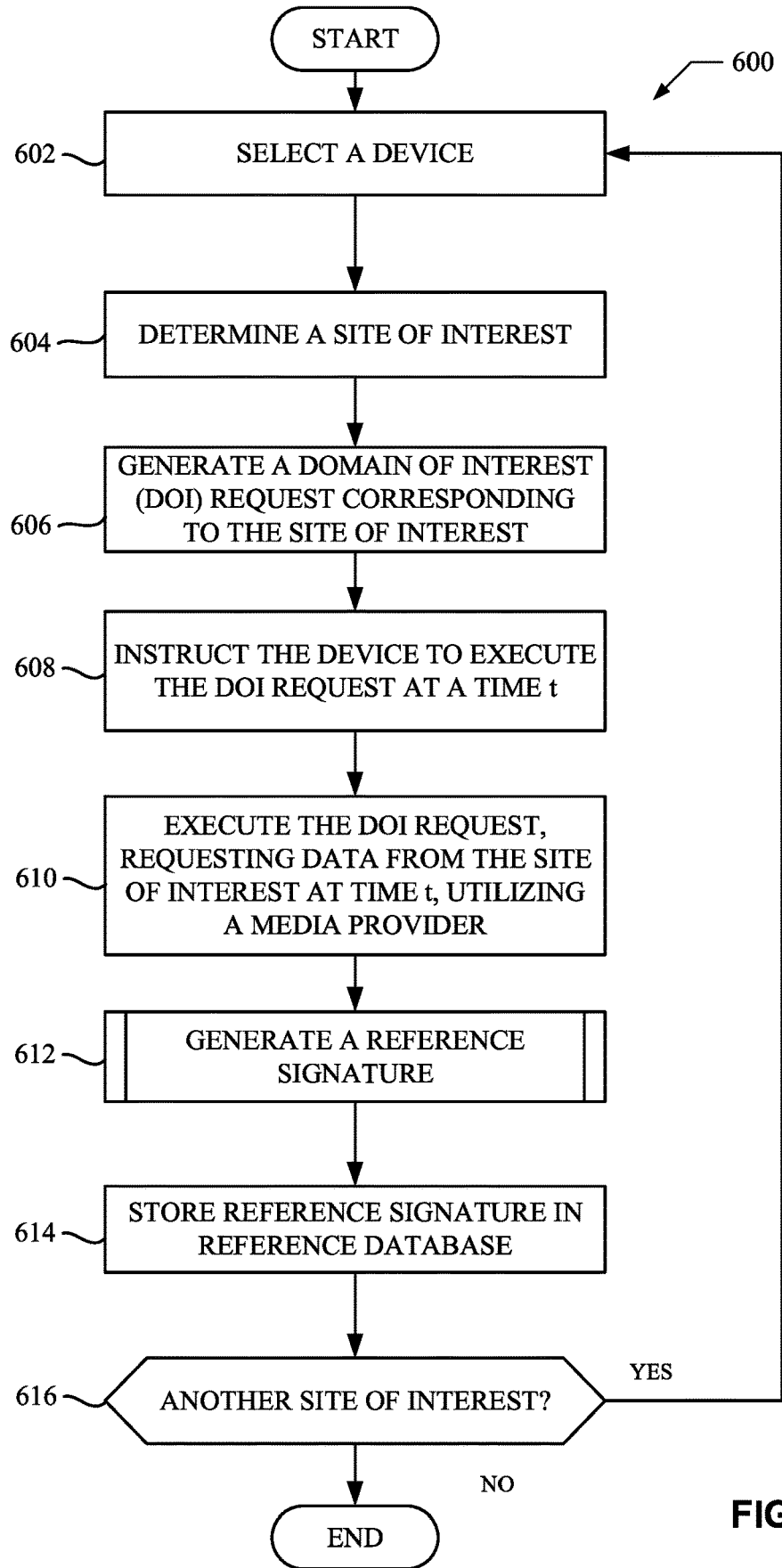
FIGS. 6 and 7 are flowcharts representative of machine readable instructions which may be executed to implement the example central facility of FIGS. 1 and 5 to generate reference signatures.
Figure 7:
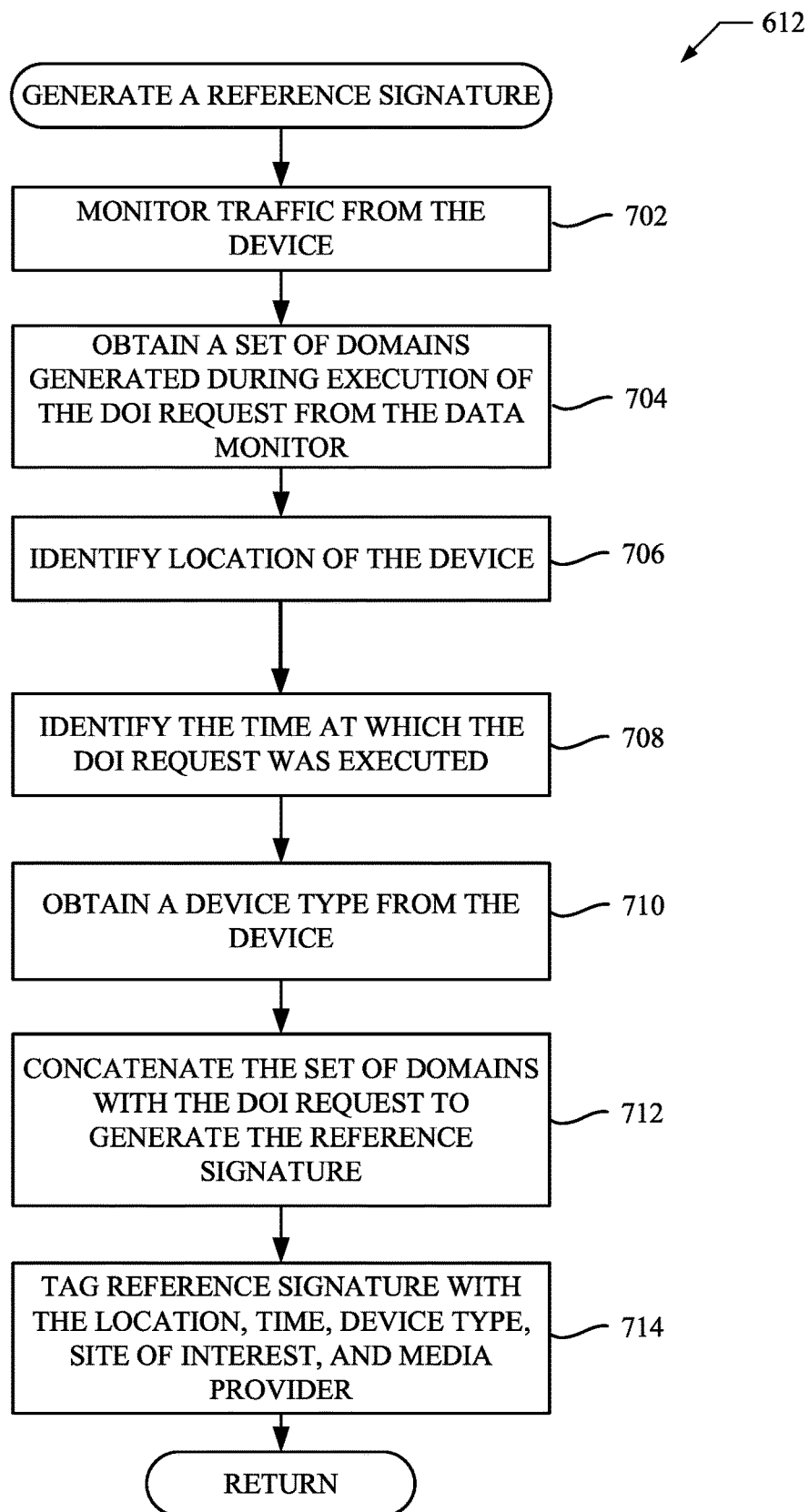
Figure 9:
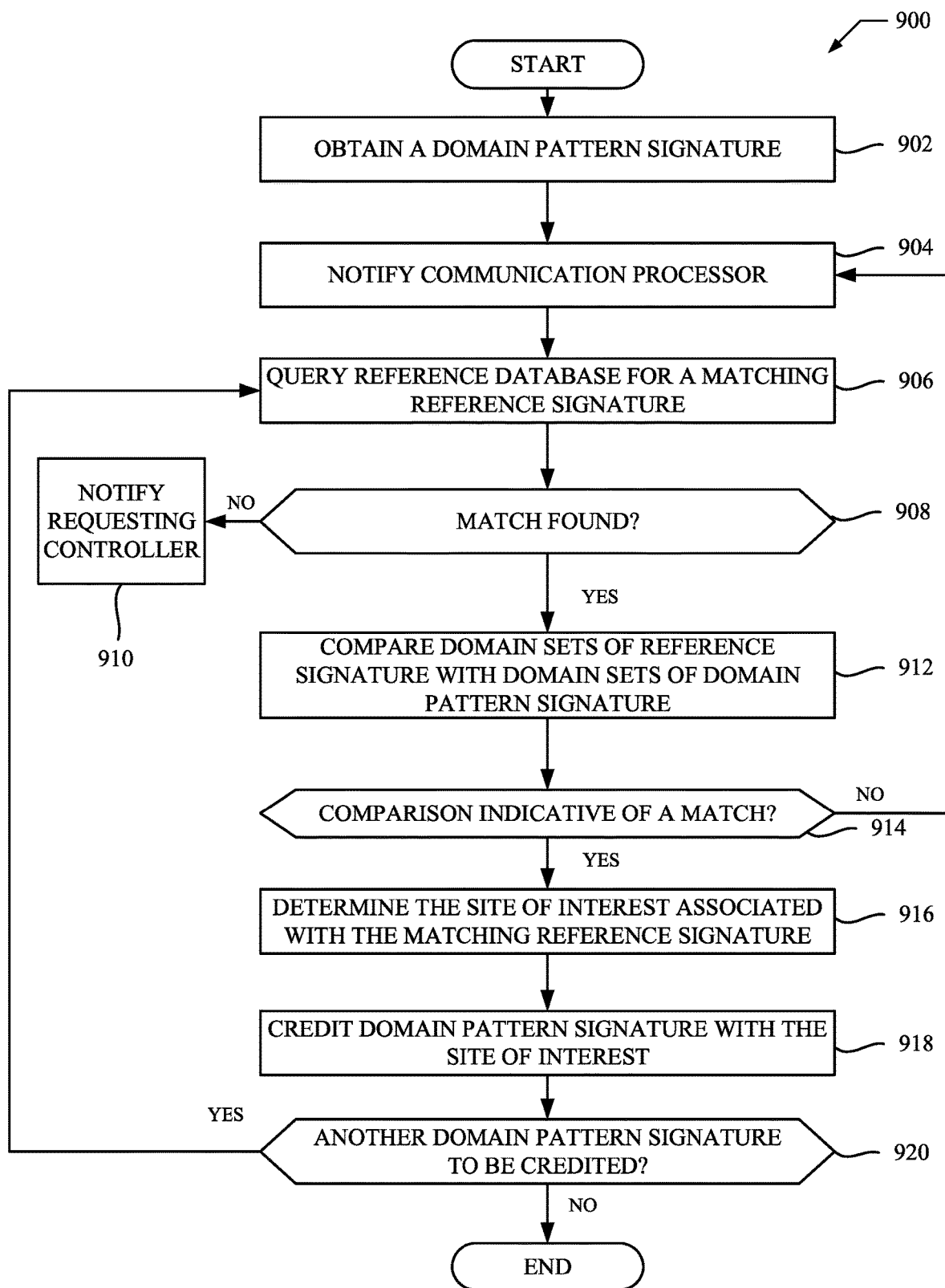
FIG. 9 is a flowchart representative of machine readable instructions which may be executed to implement the example central facility of FIGS. 1 and 5 to credit sites of interest.

Flowcharts representative of example hardware logic, machine readable instructions, hardware implemented state machines, and/or any combination thereof for implementing the central facility 170 of FIGS. 1 and 5 is shown in FIGS. 6, 7 and 9. The machine readable instructions may be one or more executable programs or portion(s) of an executable program for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 6, 7, and 9, many other methods of implementing the example central facility 170 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 8:
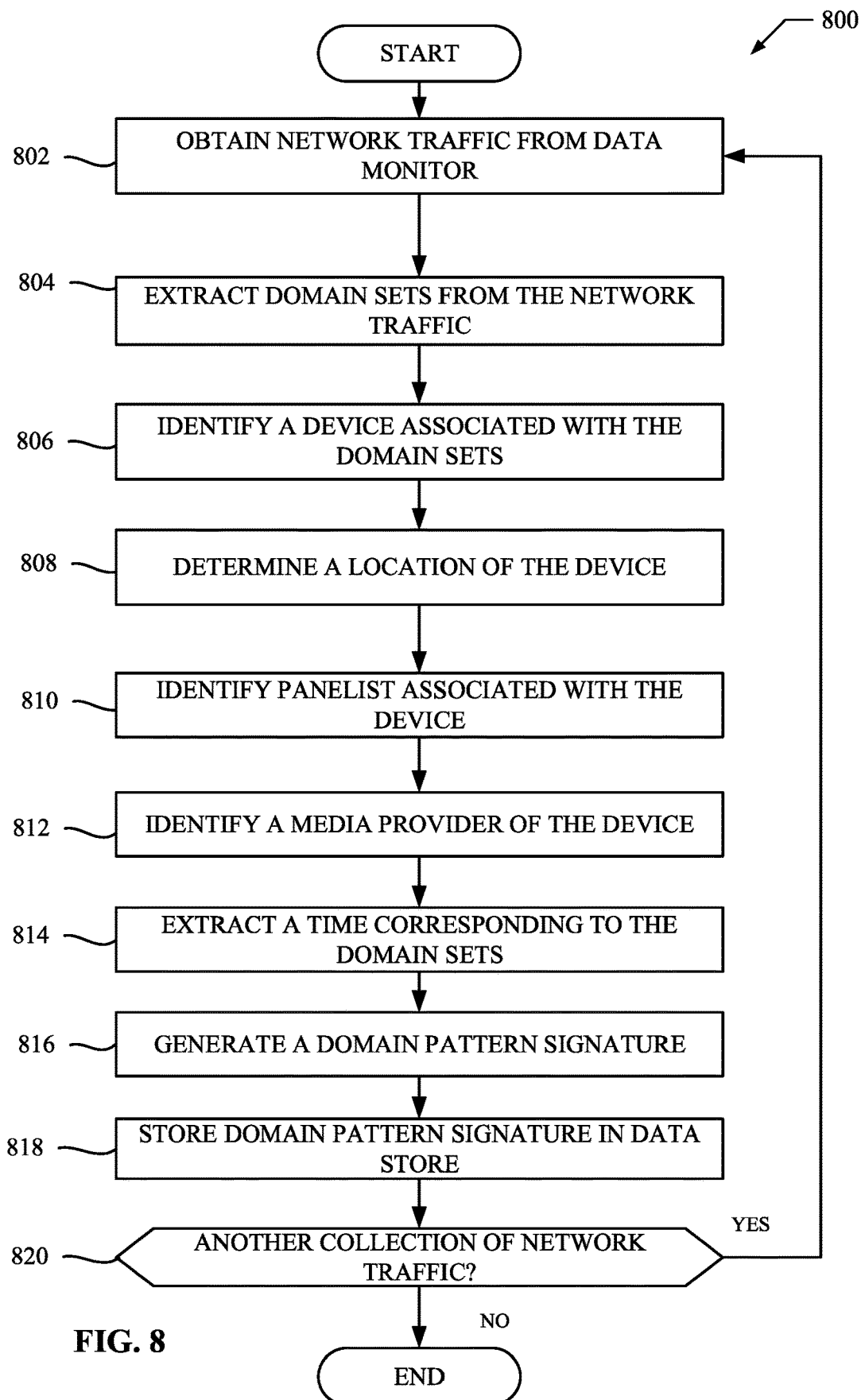
FIG. 8 is a flowchart representative of machine readable instructions which may be executed to implement the example meter of FIGS. 1 and 3 to generate domain pattern signatures.

A flowchart representative of example hardware logic, machine readable instructions, hardware implemented state machines, and/or any combination thereof for implementing the meter 130 of FIGS. 1 and 3 is shown in FIG. 8. The machine readable instructions may be one or more executable programs or portion(s) of an executable program for execution by a computer processor such as the processor 1112 shown in the example processor platform 1100 discussed below in connection with FIG. 11. The program(s) may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIG. 8, many other methods of implementing the example meter 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 6 illustrates an example reference signature generation program 600 to populate the example reference database 540 (FIG. 5) with reference signatures. The example reference signature generation program 600 includes the example requesting controller 505 (FIG. 5) selecting a device (block 602). For example, the requesting controller 505 determines and/or otherwise identifies at least one of the devices 510, 515, 520 (FIG. 5) that are available to execute requests for data.

The example requesting controller 505 determines a site of interest (block 604). For example, the requesting controller 505 selects a web server, an Internet provider, a streaming media service, etc., to request data from. Further, the example requesting controller 505 generates a DOI request corresponding to the site of interest (block 606). For example, the requesting controller 505 generates a URL including a domain name equal to and/or corresponding to the name of the site of interest.

The example requesting controller 505 instructs the device to execute the DOI request at a time t (block 608). For example, the requesting controller 505 provides the DOI request to the selected one of the devices 510, 515, 520 in addition to a notification indicating that the DOI is to be requested at a specific time (e.g., time t). In some examples, the requesting controller 505 may provide a plurality of times for which the selected one of the devices 510, 515, 520 is to execute the DOI request.

The device executes the DOI request, requesting data from the site of interest at time t, utilizing a media provider (block 610). For example, the selected one of the devices 510, 515, 520 obtains the DOI request, opens and/or initiates a web browser, and submits the DOI request to the network 120 (FIG. 1). The selected one of the devices 510, 515, 520 have a corresponding media provider (e.g., media provider 110 of FIG. 1) that enables the selected one of the devices 510, 515, 520 to submit the DOI request to the site of interest.

The example reference signature generator 535 generates a reference signature (block 612). For example, the reference signature generator 535 obtains network traffic data generated during the execution of the DOI request and identifying information from the selected one of the devices 510, 515, 520, and generates a reference signature. Further example instructions that may be used to implement block 612 are disclosed below in connection with FIG. 7. The example reference signature generator 535 stores the reference signature in the reference database 540 (block 614). For example, the reference signature generator 535 provides the reference signature to the reference database 540 for subsequent use by the example comparator 555 (FIG. 5).

The example requesting controller 505 determines if there is another site of interest (block 616). For example, the requesting controller 505 determines if the reference database 540 includes additional reference signatures corresponding to additional site(s) of interest and/or if there are additional site(s) of interest for which a reference signature has not yet been generated. In some examples, the requesting controller 505 determines there is another site of interest (e.g., block 616 returns a value YES) and control returns to block 602. Alternatively, the example requesting controller 505 determines there is not another site of interest (e.g., block 616 returns a value NO) and the reference signature generation program 600 ends. The reference signature generation program 600 may be repeated when a new site of interest is available.

Turning to FIG. 7, the generation of a reference signature includes the example data monitor 530 monitoring traffic from the device (block 702). For example, when the selected one of the devices 510, 515, 520 executes the DOI request, the example data monitor 530 monitors and collects the network traffic corresponding to the DOI request.

The example reference signature generator 535 obtains a set of domains generated during execution of the DOI request from the example data monitor 530 (block 704). For example, the reference signature generator 535 obtains requests made to advertisement servers, CDN servers, DNS servers, etc., when the selected on of the devices 510, 515, 520 attempts to render content from the DOI server. Such domain sets are representative of a network traffic pattern corresponding to the device, location, time, media provider, and site of interest.

The example reference signature generator 535 identifies the location of the device (block 706). For example, the reference signature generator 535 queries the selected one of the devices 510, 515, 520 for location information. Additionally, the example reference signature generator 535 identifies the time at which the DOI request was executed (block 708). For example, the reference signature generator 535 retrieves data from memory of the selected one of the devices 510, 515, 520 corresponding to the time t at which the selected one of the devices 510, 515, 520 was configured to execute the DOI request.

The example reference signature generator 535 obtains a device type from the device (block 710). For example, the reference signature generator 535 queries the selected one of the devices 510, 515, 520 for configuration characteristics corresponding to its make and model.

The example reference signature generator 535 concatenates the set of domains with the DOI request to generate the reference signature (block 712). For example, the reference signature generator 535 obtains the DOI request from either the selected one of the devices 510, 515, 520 or the data monitor 530 and creates a vector, matrix, text string, etc., with the DOI request and the sets of domains.

Further, the example reference signature generator 535 tags the reference signature with the location, time, device type, site of interest, and/or the media provider (block 714). For example, the reference signature generator 535 utilizes the location, time, device type, site of interest, and/or media provider as metadata for the reference signature. The example reference signature generator 535 completes the generation of the reference signature when the reference signature is tagged with the metadata, indicative of the location, time, device type, site of interest, and/or media provider. The reference signature generation program 600 may be repeated when the example reference signature FIG. 8 illustrates an example domain pattern signature generation program 800 to generate a domain pattern signature at the example meter 130 (FIG. 3). The example domain pattern signature generation program 800 includes the example context collection controller 305 (FIG. 3) obtaining network traffic from the example data monitor 140 (FIG. 1) (block 802). For example, the context collection controller 305 receives and/or otherwise obtains information, such as URLs, HTTP requests, domain requests, data packets, etc., that go to and from media environment 105, from the data monitor 140.

The example context collection controller 305 extracts domain sets from the network traffic (block 804). For example, the context collection controller 305 identifies domain names within the requests for data. In some examples, the context collection controller 305 analyzes and/or parses the requests for the portions of the requests that corresponds to a domain. In some examples, the domain sets are referred to as a network traffic pattern.

Further, the example context collection controller 305 identifies a device associated with the domain sets (block 806). For example, the network traffic, such as a request, includes a source address and a destination address. In some examples, the context collection controller 305 identifies the source address of the network traffic, because the source address is indicative of the device that sent the request. In some examples, the context collection controller 305 parses the requests for the portions of the requests that correspond to the source address. In some examples, the source address may be an IP address associated with a device. The example context collection controller 305 may provide the domain sets and device identifier to the example domain pattern signature generator 315 (FIG. 3).

The example domain pattern signature generator 315 obtains domain sets and a device identifier from the example context collection controller 305. In addition, the example domain pattern signature generator 315 obtains panelist data, such as demographic data, from the example panelist collection controller (FIG. 3). The example domain pattern signature generator 315 identifies a location of the device (block 808). For example, the domain pattern signature generator 315 analyzes the device identifier (e.g., the source address) to determine the location of the device.

The example domain pattern signature generator 315 identifies a panelist associated with the device (block 810). For example, the panelist data may be indicative of which panelist owns/utilizes which device. In such an example, a panelist identifier (e.g., panelist identifier 5000) may be associated with a device identifier (e.g., a source address of 10.100.100.000).

The example domain pattern signature generator 315 identifies a media provider of the device (block 812). For example, the domain pattern signature generator 315 may utilize the panelist data to determine the media provider that the panelist utilized to set up and/or configure their device with the network 120 (e.g., the Internet). In some examples, the domain pattern signature generator 315 analyzes the domain sets to determine the media provider. For example, the domain sets may include metadata and/or header data indicative of an ISP.

The example domain pattern signature generator 315 extracts a time corresponding to the domain sets (block 814). For example, the requests (e.g., data packets) include a timestamp. In some examples, the domain sets were generated and/or received within a time duration (e.g., 1 second, 1 minute, etc.). For example, the domain sets include timestamps for times between 6:00 pm and 6:01 pm. Alternatively, the time duration of timestamps may be longer, such as 6:00 pm to 6:30 pm. In such examples, the domain pattern signature generator 315 extracts the timestamp with the earliest time of day.

The example domain pattern signature generator 315 generates a domain pattern signature (block 816). For example, the domain pattern signature generator 315 concatenates the set of domain requests corresponding to the device. Further, the domain pattern signature generator 315 tags the concatenated set of domain names with the device type, media provider, location, and time to generate the domain pattern signature.

The example domain pattern generator 315 stores the domain pattern signature in the example data store 320 (block 818). For example, the domain pattern signature generator 315 provides the domain pattern signature to the data store 320. The example domain pattern signature generator 315 may associate (e.g., correlate) the domain pattern signature with the panelist data and store the information in the example data store 320.

The example context collection controller 305 determines if the data monitor 140 has provided another collection of network traffic (block 820). For example, the context collection controller 305 receives an indication of new, subsequent, additional, and/or alternative network traffic data from the data monitor 140. When the context collection controller 305 determines the data monitor 140 has provided another collection of network traffic (e.g., block 820 returns a value YES), control returns to block 802. When the context collection controller 305 determines the data monitor 140 has not provided another collection of network traffic (e.g., block 820 returns a value no), the domain pattern signature generation program 800 ends.

In some examples, the domain pattern signature generation program 800 repeats when a device within the media environment 105 submits a web request, such as a DOI request.

FIG. 9 illustrates an example crediting program 900, executed at the central facility 170, to credit a media stream signature with a domain. The example crediting program 900 includes the example interface 550 (FIG. 5) obtaining a domain pattern signature (block 902). For example, the interface 550 may obtain a domain pattern signature from the example network communication processor 325 (FIG. 3).

The example interface 550 notifies the example communication processor 545 (FIG. 5) (block 904). For example, the interface 550 provides instructions and/or the domain pattern signature to the example communication processor 545. In some examples, the instructions are indicative to find a reference signature with similar metadata as the domain pattern signature. For example, the interface 550 instructs the communication processor 545 to perform a query for reference signatures having the same device type as the domain pattern signatures. Additionally and/or alternatively, the interface 550 instructs the communication processor 545 to perform a query for reference signatures having the same timestamp and the same location as the domain pattern signatures.

The example communication processor 545 queries the example reference database 540 (FIG. 5) for a matching reference signature (block 906). For example, the communication processor 545 utilizes the device type, the location, the time, and/or the media provider of the domain pattern signature to find a reference signature with matching data (e.g., with a matching device type, location, time, and/or media provider).

The communication processor 545 determines if a match was found (block 908). For example, the communication processor 545 determines if the reference database 540 includes a matching reference signature. If the example communication processor 545 determines a match was not found (e.g., block 908 returns a value NO), the example communication processor 545 notifies the example requesting controller 505 (FIG. 5) (block 910). For example, the communication processor 545 informs the requesting controller 505 to generate a new DOI request with the metadata (e.g., device type, location, time, and/or media provider) of the domain pattern signature.

If the communication processor 545 determines a match was found (e.g., block 908 returns a value YES), the example comparator 555 (FIG. 5) compares the domain sets of the reference signature with domain sets of the domain pattern signature (block 912). For example, the comparator 555 obtains the reference signature from the communication processor 545 and the domain pattern signature from the interface 550 and determines if the concatenated domain names of the reference signature match the concatenated domain names of the domain pattern signature. For example, a match is identified when the reference signature includes an identical location as the domain pattern signature, an identical device type as the domain pattern signature, an identical ISP as the domain pattern signature, and/or a timestamp within a threshold range of time from the timestamp of the domain pattern signature.

The example comparator 555 determines if the comparison is indicative of a match (block 914). If the comparator 555 determines that the concatenated domain names of the reference signature do not match the concatenated domain names of the domain pattern signature (e.g., block 914 returns a value NO), control returns to block 904. If the example comparator 555 determines that the concatenated domain names of the reference signature match the concatenated domain names of the domain pattern signature (e.g., block 914 returns a value YES), the example credit controller 560 credits the domain pattern signature with the site of interest (block 918).

For example, the credit controller 560 identifies the site of interest corresponding to the reference signature. Further, the example credit controller 560 credits the domain pattern signature with the site of interest. For example, the credit controller 560 associates, correlates, tags, appends, etc., the site of interest to the domain pattern signature.

The example communication processor 545 determines if another domain pattern signature is to be analyzed and/or credited (block 920). For example, the communication processor 545 may include a queue of domain pattern signatures, provided by the interface 550, to identify reference signatures for. In such an example (e.g., block 920 returns a value YES), control returns to block 906. However, if the example communication processor 545 determines that there is not another domain pattern signature to be credited (e.g., block 920 returns a value NO), the crediting program 900 ends.

The example crediting program 900 may be repeated when the example interface 550 obtains a new, subsequent, additional, and/or alternative set of media stream signatures to be credited.

Figure 10:
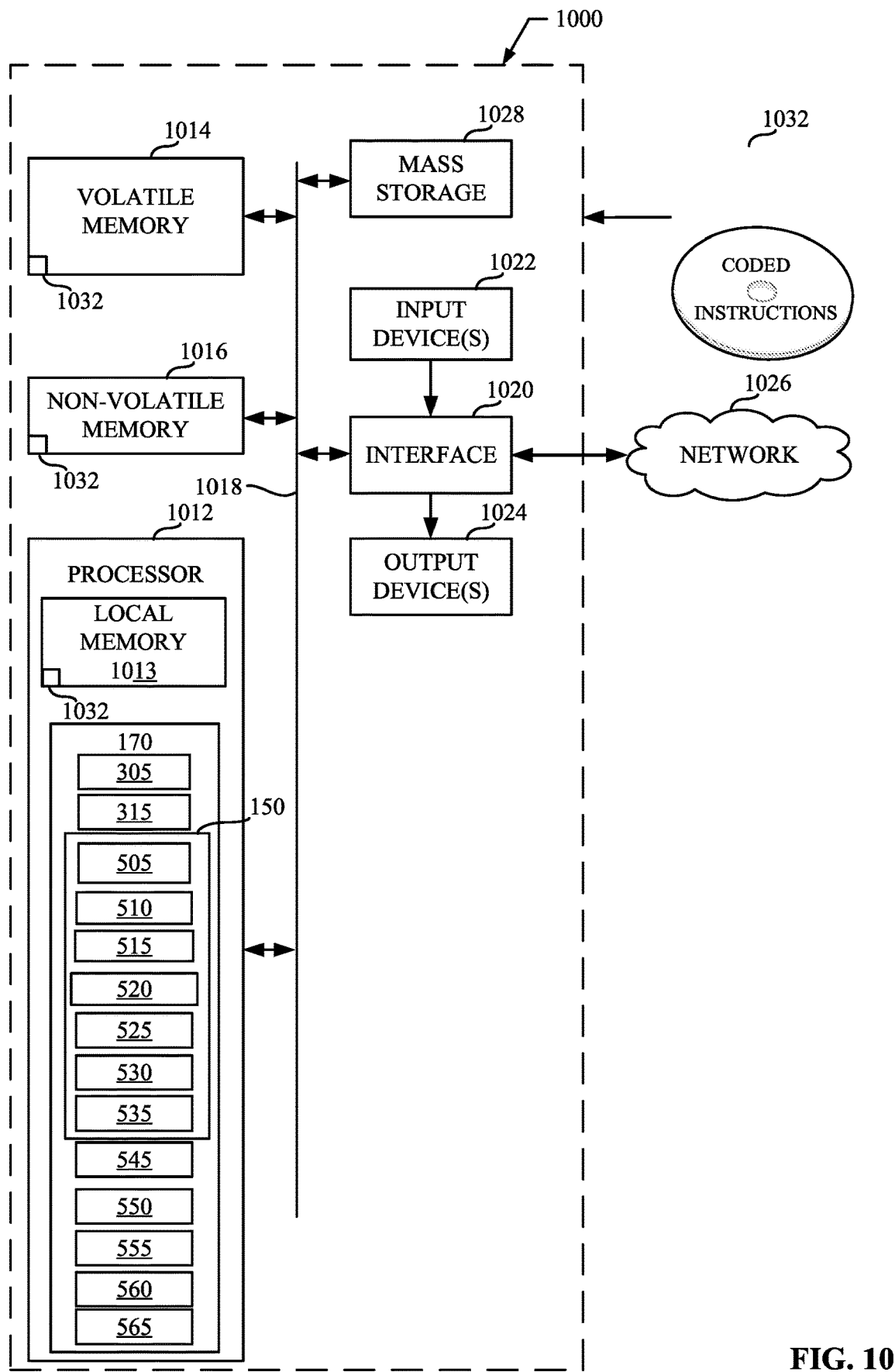
FIG. 10 is a block diagram of an example processing platform structured to execute the instructions of FIGS. 6, 7, and 9 to implement the example central facility of FIGS. 1 and 5.

FIG. 10 is a block diagram of an example processor platform 1000 structured to execute the instructions of FIGS. 6, 7, and 9 to implement the central facility 170 of FIG. 5. The processor platform 1000 can be, for example, a server, a personal computer, a workstation, a self-learning machine (e.g., a neural network), an Internet appliance, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example context collection controller 305, the example domain pattern signature generator 315, the example requesting controller 505, the example first device 510, the example second device 515, the example third device 520, the example network device 525, the example data monitor 530, the example reference signature generator 535, the example communication processor 545, the example interface 550, the example comparator 555, the example credit controller 560, and the example report generator 565.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6, 7, and 9 may be stored in the mass storage device 1028, in the volatile memory 1014, in the non-volatile memory 1016, and/or on a removable non-transitory computer readable storage medium such as a CD or DVD.

Figure 11:
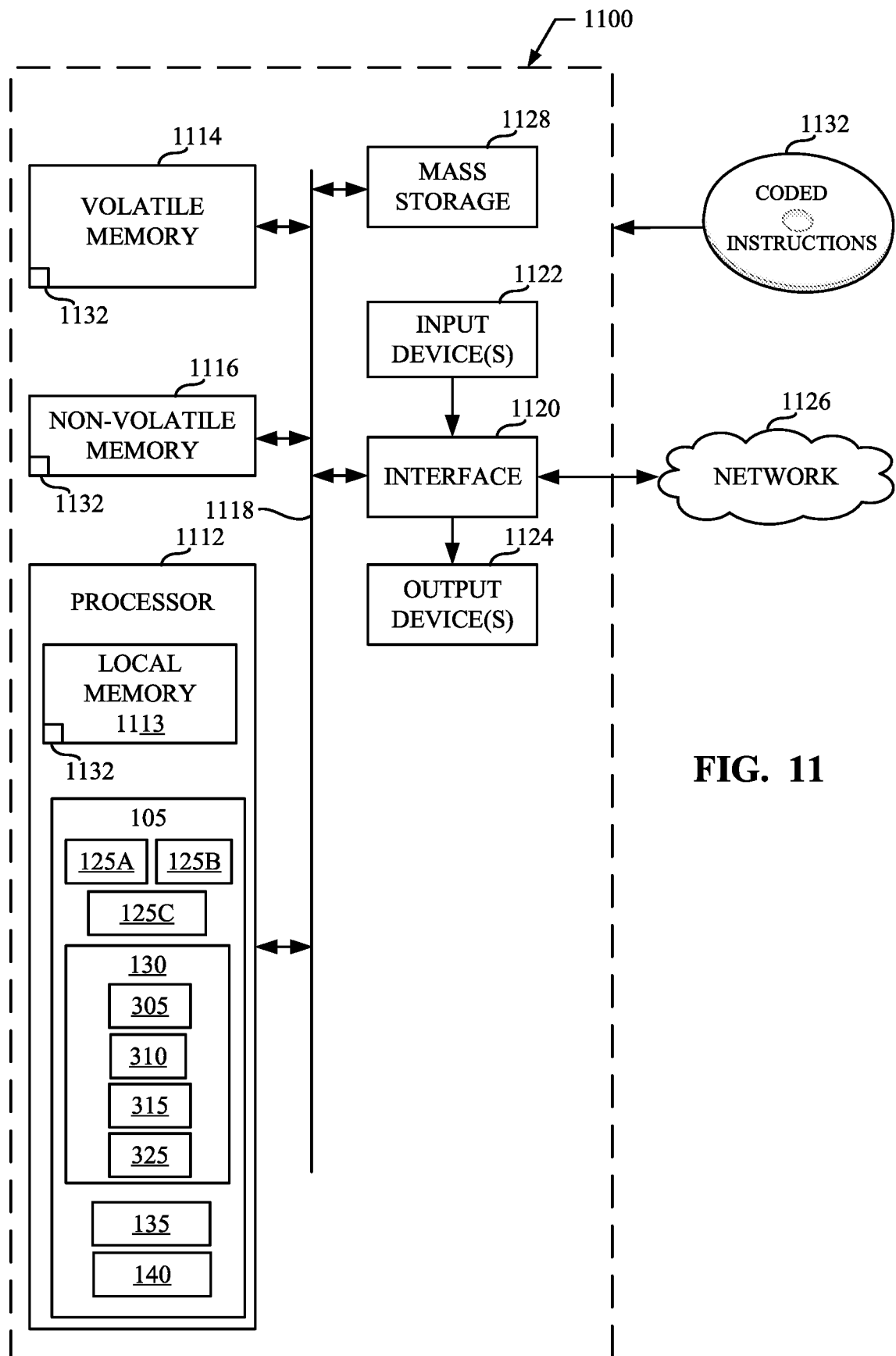
FIG. 11 is a block diagram of an example processing platform structured to execute the instructions of FIG. 8 to implement the example meter of FIGS. 1 and 3.

FIG. 11 is a block diagram of an example processor platform 1000 structured to execute the instructions of FIG. 8 to implement the meter 130 of FIG. 3. The processor platform 1100 can be, for example, a server, a personal computer, a workstation, a self-learning machine (e.g., a neural network), an Internet appliance, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example first device 125A, the example second device 125B, the example third device 125C, the example meter 130, the example context collection controller 305, the example panelist collection controller 310, the example domain pattern signature generator 315, the example network communication processor 325, the example network device 135, and the example data monitor 140.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by SDRAM, DRAM, RDRAM® and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, a Bluetooth® interface, an NFC interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., an LED, an OLED, an LCD, a CRT display, an IPS display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a DSL connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

The machine executable instructions 1132 of FIG. 11 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that credit media consumption or exposure on or via the Internet by generating reference signatures with a known site of interest and comparing the reference signatures to domain pattern signatures to determine a match. The disclosed methods, apparatus and articles of manufacture improve the accuracy of crediting Internet/network media consumption to sites of interest by generating the reference signatures with a known site of interest and comparing the reference signatures against domain patterns and/or network traffic patterns represented by domain pattern signatures generated as users browse the web consuming Internet media. Thus, the examples disclosed herein remove inaccuracies in the crediting of Internet media consumption that are introduced by human analysts and/or via traditional methods that introduce computer-generated errors by, for example, inaccurately crediting intermediary servers such as CDNs as noted above. The examples disclosed herein remove human subjectivity and fallibility and also remove computer-generated inaccuracies by objectively and accurately determining Internet media consumption in accordance with the teachings disclosed herein. The disclosed methods, apparatus and articles of manufacture improve the efficiency of using a computing device by removing and/or disregarding network traffic corresponding to outside DOIs to accurately credit the appropriate DOI. The disclosed methods, apparatus and articles of manufacture are accordingly directed to one or more improvement(s) in the functioning of a computer.

Example methods, apparatus, systems, and articles of manufacture to measure Internet media consumption are disclosed herein. Further examples and combinations thereof include the following: Example 1 includes an apparatus comprising a controller to trigger execution of a request to obtain media from an Internet site, and a reference signature generator to identify a set of domain names generated during the execution of the request, and generate a reference signature based on (a) the set of domain names and (b) one or more of a location of the request, a time of the request, or a characteristic of a device used to execute the request.

Example 2 includes the apparatus of example 1, wherein the reference signature generator is to generate the reference signature based on a concatenation of the domain names in the set of domain names.

Example 3 includes the apparatus of example 1, wherein the request is a first request, the media is first media, and the Internet site is a first Internet site, and the controller is to trigger execution of a second request for second media from a second Internet site, the second Internet site different than the first Internet site.

Example 4 includes the apparatus of example 3, wherein the reference signature is a first reference signature, the set of domain names is a first set of domain names, and the reference signature generator is to identify a second set of domain names generated during the execution of the second request, the second set of domain names different than the first set of domain names, and generate a second reference signature based on (a) the second set of domain names generated during the execution of the second request and (b) one or more of a location of the second request, a time of the second request, or the characteristic of the device used to execute the second request.

Example 5 includes the apparatus of example 1, wherein the device is a first device, and the controller is to trigger the first device to execute the request to obtain the media from the Internet site, trigger a second device to execute the request to obtain the media from the Internet site, and trigger a third device to execute the request to obtain the media from the Internet site.

Example 6 includes the apparatus of example 5, wherein the reference signature is a first reference signature, the set of domain names is a first set of domain names, and the reference signature generator is to identify a second set of domain names generated during the execution of the request by the second device, the second set of domain names different than the first set of domain names, generate a second reference signature based on (a) the second set of domain names generated during the execution of the request by the second device and (b) one or more of a location of the request, a time of the request, or the characteristic of the second device, the second reference signature different than the first reference signature, identify a third set of domain names generated during the execution of the request by the third device, the third set of domain names different than the first set of domain names or the second set of domain names, and generate a third reference signature based on (a) the third set of domain names generated during the execution of the request by the third device and (b) one or more of a location of the request, a time of the request, or the characteristic of the third device, the third reference signature different than the first reference signature or the second reference signature.

Example 7 includes the apparatus of example 1, wherein the request is a first request, the time is a first time, the reference signature is a first reference signature, the set of domain names is a first set of domain names, wherein the controller is to trigger execution of a second request to obtain the media from the Internet site at a second time, the second time different than the first time, and the reference signature generator is to identify a second set of domain names generated during the execution of the second request, the second set of domain names different than the first set of domain names, and generate a second reference signature based on (a) the second set of domain names generated during the execution of the second request and (b) one or more of a location of the second request, the second time, or the characteristic of the device used to execute the second request.

Example 8 includes the apparatus of example 1, wherein the request is a first request, the location is a first location, the reference signature is a first reference signature, the set of domain names is a first set of domain names, wherein the controller is to trigger execution of a second request to obtain the media from the Internet site from a second location, the second location different than the first location, and the reference signature generator is to identify a second set of domain names generated during the execution of the second request, the second set of domain names different than the first set of domain names, and generate a second reference signature based on (a) the second set of domain names generated during the execution of the second request and (b) one or more of the second location, a time of the second request, or the characteristic of the device used to execute the second request.

Example 9 includes the apparatus of example 1, wherein the reference signature generator is to generate the reference signature based on an identifier of a media provider used by the device to execute the request.

Example 10 includes the apparatus of example 1, wherein the device is a first device, the request is a first request, the media is first media, and the Internet site is a first Internet site, and further including a comparator to perform a comparison between the reference signature and a domain pattern signature, the domain pattern signature generated in response to a second device executing a second request for second media from a second Internet site, and identify the second media as the first media and the second Internet site as the first Internet site based on the comparison.

Example 11 includes the apparatus of example 10, further including a credit controller to credit the second Internet site with the second media to verify the second media was consumed.

Example 12 includes the apparatus of example 1, further including the device that is to execute the request to obtain the media from the Internet site, the device being a virtualized hardware resource.

Example 13 includes a non-transitory computer readable storage medium comprising instructions that, when executed, cause a processor to at least trigger execution of a request to obtain media from an Internet site, identify a set of domain names generated during the execution of the request, and generate a reference signature based on (a) the set of domain names and (b) one or more of a location of the request, a time of the request, or a characteristic of a device used to execute the request.

Example 14 includes the non-transitory computer readable storage medium of example 13, wherein the instructions, when executed, cause the processor to generate the reference signature based on a concatenation of the domain names in the set of domain names.

Example 15 includes the non-transitory computer readable storage medium of example 13, wherein the request is a first request, the media is first media, the Internet site is a first Internet site, the reference signature is a first reference signature, the set of domain names is a first set of domain names and the instructions, when executed, cause the processor to trigger execution of a second request for second media from a second Internet site, the second Internet site different than the first Internet site, identify a second set of domain names generated during the execution of the second request, the second set of domain names different than the first set of domain names, and generate a second reference signature based on (a) the second set of domain names generated during the execution of the second request and (b) one or more of a location of the second request, a time of the second request, or the characteristic of the device used to execute the second request.

Example 16 includes the non-transitory computer readable storage medium of example 13, wherein the device is a first device, the set of domain names is a first set of domain names, the reference signature is a first reference signature, and the instructions, when executed, cause the processor to trigger a second device to execute the request to obtain the media from the Internet site, trigger a third device to execute the request to obtain the media from the Internet site, identify a second set of domain names generated during the execution of the request by the second device, the second set of domain names different than the first set of domain names, generate a second reference signature based on (a) the second set of domain names generated during the execution of the request by the second device and (b) one or more of a location of the request, a time of the request, or a characteristic of the second device, the second reference signature different than the first reference signature, identify a third set of domain names generated during the execution of the request by the third device, the third set of domain names different than the first set of domain names or the second set of domain names, and generate a third reference signature based on (a) the third set of domain names generated during the execution of the request by the third device and (b) one or more of a location of the request, a time of the request, or a characteristic of the third device, the third reference signature different than the first reference signature or the second reference signature.

Example 17 includes the non-transitory computer readable storage medium of example 13, wherein the request is a first request, the time is a first time, the reference signature is a first reference signature, the set of domain names is a first set of domain names and the instructions, when executed, cause the processor to trigger execution of a second request to obtain the media from the Internet site at a second time, the second time different than the first time, identify a second set of domain names generated during the execution of the second request, the second set of domain names different than the first set of domain names, and generate a second reference signature based on (a) the second set of domain names generated during the execution of the second request and (b) one or more of a location of the second request, the second time, or the characteristic of the device used to execute the second request.

Example 18 includes the non-transitory computer readable storage medium of example 13, wherein the request is a first request, the location is a first location, the reference signature is a first reference signature, the set of domain names is a first set of domain names and the instructions, when executed, cause the processor to trigger execution of a second request to obtain the media from the Internet site from a second location, the second location different than the first location, identify a second set of domain names generated during the execution of the second request, the second set of domain names different than the first set of domain names, and generate a second reference signature based on (a) the second set of domain names generated during the execution of the second request and (b) one or more of the second location, a time of the second request, or the characteristic of the device used to execute the second request.

Example 19 includes the non-transitory computer readable storage medium of example 13, wherein the instructions, when executed, cause the processor to generate the reference signature based on an identifier of a media provider used by the device to execute the request.

Example 20 includes the non-transitory computer readable storage medium of example 13, wherein the device is a first device, the request is a first request, the media is first media, and the Internet site is a first Internet site, and the instructions, when executed, cause the processor to perform a comparison between the reference signature and a domain pattern signature, the domain pattern signature generated in response to a second device executing a second request for second media from a second Internet site, identify the second media as the first media and the second Internet site as the first Internet site based on the comparison, and credit the second Internet site with the second media to verify the second media was consumed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer-readable storage medium, having stored thereon machine-readable instructions that, when executed by a processor, cause performance of operations comprising: collecting network traffic on a network at a media environment, wherein the network traffic is associated with a request by a client device to access media over the Internet; based on the network traffic, determining a network traffic pattern comprising from a set of domain names corresponding to the request; and generating a domain pattern signature based on the set of domain names of the network traffic pattern and one or more device characteristics of the client device.

2. The non-transitory computer-readable storage medium of claim 1, the operations further comprising: determining the one or more device characteristics, wherein the one or more device characteristics comprise one or more of a location of the client device, a media provider of the client device, a device type of the client device, or demographic data of a panelist associated with the client device.

3. The non-transitory computer-readable storage medium of claim 1, the operations further comprising: based on the network traffic, determining a time of the request, wherein generating the domain pattern signature is further based on the time of the request.

4. The non-transitory computer-readable storage medium of claim 1, the operations further comprising: transmitting, via a network interface, the domain pattern signature to a remote computing system of an audience measurement entity.

5. The non-transitory computer-readable storage medium of claim 1, the non-transitory computer-readable storage medium of the operations further comprising: comparing the domain pattern signature to reference signatures to determine that a particular reference signature of the reference signatures includes (i) a reference network traffic pattern that matches the network traffic pattern and (ii) one or more reference device characteristics that match the one or more device characteristics of the client device; and crediting the domain pattern signature with an Internet site associated with the particular reference signature.

6. The non-transitory computer-readable storage medium of claim 5, the non-transitory computer-readable storage medium of the operations further comprising: triggering one or more devices to execute reference requests to access media over the Internet; generating the reference signatures based on domain names corresponding to the reference requests.

7. The non-transitory computer-readable storage medium of claim 1, wherein: the media environment comprises a router and a network monitor device, the network monitor device is separate from the router, and the processor comprises a processor of the network monitor device.

8. A computing system comprising: a processor; and memory having stored thereon machine-readable instructions that, when executed by the processor, cause performance of operations comprising: collecting network traffic on a network at a media environment, wherein the network traffic is associated with a request by a client device to access media over the Internet; based on the network traffic, determining a network traffic pattern from comprising a set of domain names corresponding to the request; and generating a domain pattern signature based on the set of domain names of the network traffic pattern and one or more device characteristics of the client device.

9. The computing system of claim 8, the operations further comprising: determining the one or more device characteristics, wherein the one or more device characteristics comprise one or more of a location of the client device, a media provider of the client device, a device type of the client device, or demographic data of a panelist associated with the client device.

10. The computing system of claim 8, the operations further comprising: based on the network traffic, determining a time of the request, wherein generating the domain pattern signature is further based on the time of the request.

11. The computing system of claim 8, the operations further comprising: transmitting, via a network interface, the domain pattern signature to a remote computing system of an audience measurement entity.

12. The computing system of claim 8, the operations further comprising: comparing the domain pattern signature to reference signatures to determine that a particular reference signature of the reference signatures includes (i) a reference network traffic pattern that matches the network traffic pattern and (ii) one or more reference device characteristics that match the one or more device characteristics of the client device; and crediting the domain pattern signature with an Internet site associated with the particular reference signature.

13. The computing system of claim 12, the operations further comprising: triggering one or more devices to execute reference requests to access media over the Internet; generating the reference signatures based on domain names corresponding to the reference requests.

14. The computing system of claim 8, wherein: the media environment comprises a router and a network monitor device, the computing system comprises the network monitor device and a remote computing system of an audience measurement entity, and the network monitor device is separate from the router.

15. A method comprising: collecting network traffic on a network at a media environment, wherein the network traffic is associated with a request by a client device to access media over the Internet; based on the network traffic, determining a network traffic pattern from comprising a set of domain names corresponding to the request; and generating a domain pattern signature based on the set of domain names of the network traffic pattern and one or more device characteristics of the client device.

16. The method of claim 15, further comprising: determining the one or more device characteristics, wherein the one or more device characteristics comprise one or more of a location of the client device, a media provider of the client device, a device type of the client device, or demographic data of a panelist associated with the client device.

17. The method of claim 15, further comprising: transmitting, via a network interface, the domain pattern signature to a remote computing system of an audience measurement entity.

18. The method of claim 15, wherein: the media environment comprises a router and a network monitor device, the network monitor device is separate from the router, the collecting of the network traffic, the determining of the network traffic pattern, and the generating of the domain pattern signature are performed by the network monitor device, and the comparing of the domain pattern signature to the reference signatures and the crediting are performed by a remote computing system of an audience measurement entity.

19. The method of claim 15, wherein the one or more device characteristics comprise a location of the client device, the method further comprising: determining the location of the client device based on an Internet Protocol (IP) address associated with the client device.

20. The method of claim 15, wherein generating the domain pattern signature based on the network traffic pattern and the one or more device characteristics of the client device comprises generating the domain pattern signature by concatenating the set of domain names and tagging the concatenated set of domain names with the one or more device characteristics.

* * * * *